United States Patent
Huang et al.

(10) Patent No.: US 8,331,477 B2
(45) Date of Patent: Dec. 11, 2012

(54) PROGRESSIVE PARALLEL INTERFERENCE CANCELLER AND METHOD AND RECEIVER THEREOF

(75) Inventors: Chao-Wang Huang, Taichung County (TW); Pang-An Ting, Taichung County (TW); Jiun-Yo Lai, Taichung County (TW); Chia-Chi Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 751 days.

(21) Appl. No.: 12/554,930

(22) Filed: Sep. 7, 2009

(65) Prior Publication Data

US 2011/0013735 A1  Jan. 20, 2011

(30) Foreign Application Priority Data

Jul. 16, 2009 (TW) .............................. 98124142 A

(51) Int. Cl.
*H04B 7/02* (2006.01)
*H04L 1/02* (2006.01)

(52) U.S. Cl. ......... 375/267; 375/260; 375/316; 375/347

(58) Field of Classification Search .................. 375/260, 375/267, 316, 347; 455/101; 370/334
See application file for complete search history.

(56) References Cited

U.S. PATENT DOCUMENTS

| 7,242,708 | B1 * | 7/2007 | Wang et al. ................... 375/148 |
| 7,583,766 | B2 * | 9/2009 | Hongming et al. .......... 375/346 |
| 2005/0002445 | A1 * | 1/2005 | Dunyak et al. ................ 375/148 |
| 2009/0232247 | A1 * | 9/2009 | Nam et al. .................... 375/267 |
| 2011/0013735 | A1 | 1/2011 | Huang et al. |

FOREIGN PATENT DOCUMENTS

| CN | 101222460 | 7/2008 |
| CN | 101494467 | 7/2009 |

OTHER PUBLICATIONS

Li et al., Bounds on the Interchannel Interference of OFDM in Time-Varying Impairments, IEEE Transactions on Communications, vol. 49, No. 3, Mar. 2001.
Yasamin Mostofi et al., ICI Mitigation for Pilot-Aided OFDM Mobile Systems, IEEE Transactions on Wireless Communications, vol. 4, No. 2, Mar. 2005.
"First Office Action of China Counterpart Application", issued on Sep. 18, 2012, p1-p7, in which the listed references were cited.

* cited by examiner

*Primary Examiner* — Ted Wang
(74) *Attorney, Agent, or Firm* — Jianq Chyun IP Office

(57) ABSTRACT

A progressive parallel interference canceller (PPIC) and a method and a receiver thereof are illustrated. The PPIC reconstructs each subchannel interference reconstruction signal through several iterations and subtracts the corresponding subchannel interference reconstruction signal from each subchannel frequency-domain reception signal to obtain a subchannel frequency-domain signal. Thereby, according to the present disclosure, inter-channel interference can be cancelled without re-performing channel coding or estimating the signal to noise ratio (SNR) or frequency offset.

29 Claims, 9 Drawing Sheets

340

PROGRESSIVE PARALLEL INTERFERENCE CANCELLER AND METHOD AND RECEIVER THEREOF

CROSS-REFERENCE TO RELATED APPLICATION

This application claims the priority benefit of Taiwan application serial no. 98124142, filed on Jul. 16, 2009. The entirety of the above-mentioned patent application is hereby incorporated by reference herein and made a part of this specification.

TECHNICAL FIELD

The present disclosure generally relates to a multiple input multiple output (MIMO) communication system, and more particularly, to a progressive parallel interference canceller (PPIC) of a MIMO communication system and a method and a receiver thereof.

BACKGROUND

Broadband transmission with high spectrum efficiency and high mobiling velocity (for example, high driving speed) is the essential requirement to future mobile communication systems. The multiple input multiple output (MIMO) technique along with the orthogonal frequency-division multiplexing (OFDM) modulation technique may be the most potential means for achieving foregoing requirement. However, the effect of inter-channel interference (ICI) will become very serious along with the increases of mobiling velocity, carrier frequency, and OFDM symbol time.

When the mobiling velocity exceeds 300 km/h, the signal interference noise ratio (SINR) of an entire communication system is limited by the ICI at 20 dB. As a result, the application of high-order modulation techniques (for example, 16-quardre amplitude modulation (16-QAM) or 64-quardre amplitude modulation (64-QAM)) is restricted. Regarding the future communication systems with high data rate and high mobiling velocity (for example, the Worldwide Interoperability for Microwave Access (WiMAX) system), the mobiling velocity may be up to 350 km/h or even 500 km/h. Accordingly, a MIMO detector and a subchannel interference canceller must be provided, such that a communication system can meet aforementioned requirement.

Presently, many communication equipment manufacturers and research organizations are dedicated to providing a subchannel interference canceller with high performance, high spectrum efficiency, and low complexity, so as to compensate the subchannel interference effect in the future communication systems (for example, the WiMAX system) with high data rate and high mobiling velocity. In addition, with such a subchannel interference canceller with high performance, high spectrum efficiency, and low complexity, a communication system may even adopt a high-order modulation technique, such as aforementioned 16-QAM and 64-QAM. Thereby, a subchannel interference canceller can be applied to any mobile communication system (for example, the WiMAX system and the Digital Video Broadcast-Terrestrial (DVB-T) system) based on the OFDM modulation technique to improve the market competitiveness of a communication electronic product and create a high industrial value.

SUMMARY

An exemplary embodiment of the present disclosure provides a progressive parallel interference canceller (PPIC) adaptable to a receiver in a multiple input multiple output (MIMO) communication system based on the orthogonal frequency-division multiplexing (OFDM) modulation technique, wherein the receiver performs a plurality of iterations. The PPIC includes a plurality of subchannel interference reconstruction units and a plurality of subchannel interference cancellation units. The $k^{th}$ subchannel interference cancellation unit corresponding to an $r^{th}$ receiving antenna is coupled to the $k^{th}$ subchannel interference reconstruction unit corresponding to the $r^{th}$ receiving antenna. The $k^{th}$ subchannel interference reconstruction unit corresponding to the $r^{th}$ receiving antenna generates a $k^{th}$ subchannel interference reconstruction signal $S_{ICI,r,k}^{(i)}$ corresponding to the $r^{th}$ receiving antenna according to (2×i−2) subchannel frequency-domain estimation signals $\hat{S}_{t,((k+i-1))_N}^{(1)}$, $\hat{S}_{t,((k-i+2))_N}^{(2)}$, ..., $\hat{S}_{t,((k-2))_N}^{(i-2)}$, $\hat{S}_{t,((k-1))_N}^{(i-1)}$, $\hat{S}_{t,((k+1))_N}^{(i-1)}$, $\hat{S}_{t,((k+2))_N}^{(i-2)}$, ..., $\hat{S}_{t,((k+i-2))_N}^{(2)}$, $\hat{S}_{t,((k+i-1))_N}^{(1)}$ during the $t^{th}$ iteration, wherein i is an integer greater than 1, the subchannel frequency-domain estimation signal $\hat{S}_{t,q}^{(x)}$ represents the $q^{th}$ subchannel frequency-domain estimation signal corresponding to a $t^{th}$ transmitting antenna generated during the $x^{th}$ iteration, $((\bullet))_N$ represents a calculation of dividing by N to obtain the remainder, N is the number of subchannels in the MIMO communication system, k is an integer between 0 and (N−1), x is an integer between 1 and (i−1), and q=k−i+x or q=k+i−x. The $k^{th}$ subchannel interference cancellation unit obtains a $k^{th}$ subchannel frequency-domain signal $Y'_{r,k}^{(i)}$ corresponding to the $r^{th}$ receiving antenna according to a $k^{th}$ subchannel frequency-domain reception signal $Y_{r,k}$ and the $k^{th}$ subchannel interference reconstruction signal $S_{ICI,r,k}^{(i)}$ corresponding to the $r^{th}$ receiving antenna during the $i^{th}$ iteration.

An exemplary embodiment of the present disclosure provides a receiver adaptable to a MIMO communication system based on the OFDM modulation technique, wherein the receiver performs a plurality of iterations and includes a plurality of receiving antennas, a plurality of OFDM demodulators, a PPIC, and a MIMO detector. The PPIC includes a plurality of subchannel interference reconstruction units and a plurality of subchannel interference cancellation units. Each of the OFDM demodulators is coupled to one of the receiving antennas. The PPIC is coupled to the OFDM demodulators. The $k^{th}$ subchannel interference cancellation unit corresponding to the $r^{th}$ receiving antenna is coupled to the $k^{th}$ subchannel interference reconstruction unit corresponding to the $r^{th}$ receiving antenna. The MIMO detector is coupled to the PPIC. The $k^{th}$ subchannel interference reconstruction unit corresponding to the $r^{th}$ receiving antenna generates a $k^{th}$ subchannel interference reconstruction signal $S_{ICI,r,k}^{(i)}$ corresponding to the $r^{th}$ receiving antenna according to (2×i−2) subchannel frequency-domain estimation signals $\hat{S}_{t,((k+i-1))_N}^{(1)}$, $\hat{S}_{t,((k-i+2))_N}^{(2)}$, ..., $\hat{S}_{t,((k-2))_N}^{(i-2)}$, $\hat{S}_{t,((k-1))_N}^{(i-1)}$, $\hat{S}_{t,((k+1))_N}^{(i-1)}$, $\hat{S}_{t,((k+2))_N}^{(i-2)}$, ..., $\hat{S}_{t,((k+i-2))_N}^{(2)}$, $\hat{S}_{t,((k+i-1))_N}^{(1)}$ during the $i^{th}$ iteration, wherein i is an integer greater than 1, the subchannel frequency-domain estimation signal $\hat{S}_{t,q}^{(x)}$ represents the $q^{th}$ subchannel frequency-domain estimation signal corresponding to a $t^{th}$ transmitting antenna generated during the $x^{th}$ iteration, $((\bullet))_N$ represents a calculation of dividing by N to obtain the remainder, N is the number of subchannels in the MIMO communication system, k is an integer between 0 and (N−1), x is an integer between 1 and (i−1), and q=k−i+x or q=k+i−x. The $k^{th}$ subchannel interference cancellation unit corresponding to the $r^{th}$ receiving antenna obtains a $k^{th}$ subchannel frequency-domain signal $Y'_{r,k}^{(i)}$ corresponding to the $r^{th}$ receiving antenna according to a $k^{th}$ subchannel frequency-domain reception signal $Y_{r,k}$ and the $k^{th}$ subchannel interference reconstruction signal $S_{ICI,r,k}^{(i)}$ corresponding to the $r^{th}$ receiving antenna during the $i^{th}$ iteration. When the PPIC performs the $i^{th}$ iteration, the MIMO detector determines a plurality of bits $b_0, b_1, \ldots,$ and $b_{MT-1}$ corresponding to the $k^{th}$ subchannels of a plurality of transmitting antennas according to a plurality of $k^{th}$ subchannel frequency-domain signals $Y'_{1,k}{}^{(i)}, Y'_{2,k}{}^{(i)}, \ldots,$ and $Y'_{R,k}{}^{(i)}$ of the receiving antennas, wherein M is a bit modulation order, R is the number of the receiving antennas, T is the number of the transmitting antennas, and a plurality of bits $b_{M(t-1)}, b_{M(t-1)+1}, \ldots,$ and $b_{Mt-1}$ corresponding to the $k^{th}$ subchannel of the $t^{th}$ transmitting antenna are used for determining the subchannel frequency-domain estimation signal $\hat{S}_{t,k}{}^{(i)}$.

An exemplary embodiment of the present disclosure provides a progressive parallel interference cancellation method adaptable to a receiver in a MIMO communication system based on the OFDM modulation technique, wherein the receiver performs a plurality of iterations. A $k^{th}$ subchannel interference reconstruction signal $S_{ICI,r,k}{}^{(i)}$ corresponding to a $r^{th}$ receiving antenna is generated according to $(2 \times i-2)$ subchannel frequency-domain estimation signals $\hat{S}_{t,((k+i-1))_N}{}^{(1)}$, $\hat{S}_{t,((k-i+2))_N}{}^{(2)}, \ldots, \hat{S}_{t,((k-2))_N}{}^{(i-2)}, \hat{S}_{t,((k-1))_N}{}^{(i-1)}, \hat{S}_{t,((k+1))_N}{}^{(i-1)}$, $\hat{S}_{t,((k+2))_N}{}^{(i-2)}, \ldots, \hat{S}_{t,((k+i-2))_N}{}^{(2)}, \hat{S}_{t,((k+i-1))_N}{}^{(1)}$ during the $i^{th}$ iteration, wherein i is an integer greater than 1, the subchannel frequency-domain estimation signal $\hat{S}_{t,q}{}^{(x)}$ represents the $q^{th}$ subchannel frequency-domain estimation signal corresponding to a $t^{th}$ transmitting antenna generated during the $x^{th}$ iteration, $((\bullet))_N$ represents a calculation of dividing by N to obtain the remainder, N is the number of subchannels in the MIMO communication system, k is an integer between 0 and (N−1), x is an integer between 1 and (i−1), and q=k−i+x or q=k+i−x. Next, a $k^{th}$ subchannel frequency-domain signal $Y'_{r,k}{}^{(i)}$ corresponding to the $r^{th}$ receiving antenna is obtained according to a $k^{th}$ subchannel frequency-domain reception signal $Y_{r,k}$ and the $k^{th}$ subchannel interference reconstruction signal $S_{ICI,r,k}{}^{(i)}$ corresponding to the $r^{th}$ receiving antenna during the $i^{th}$ iteration.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF THE EMBODIMENTS

Figure 1A:
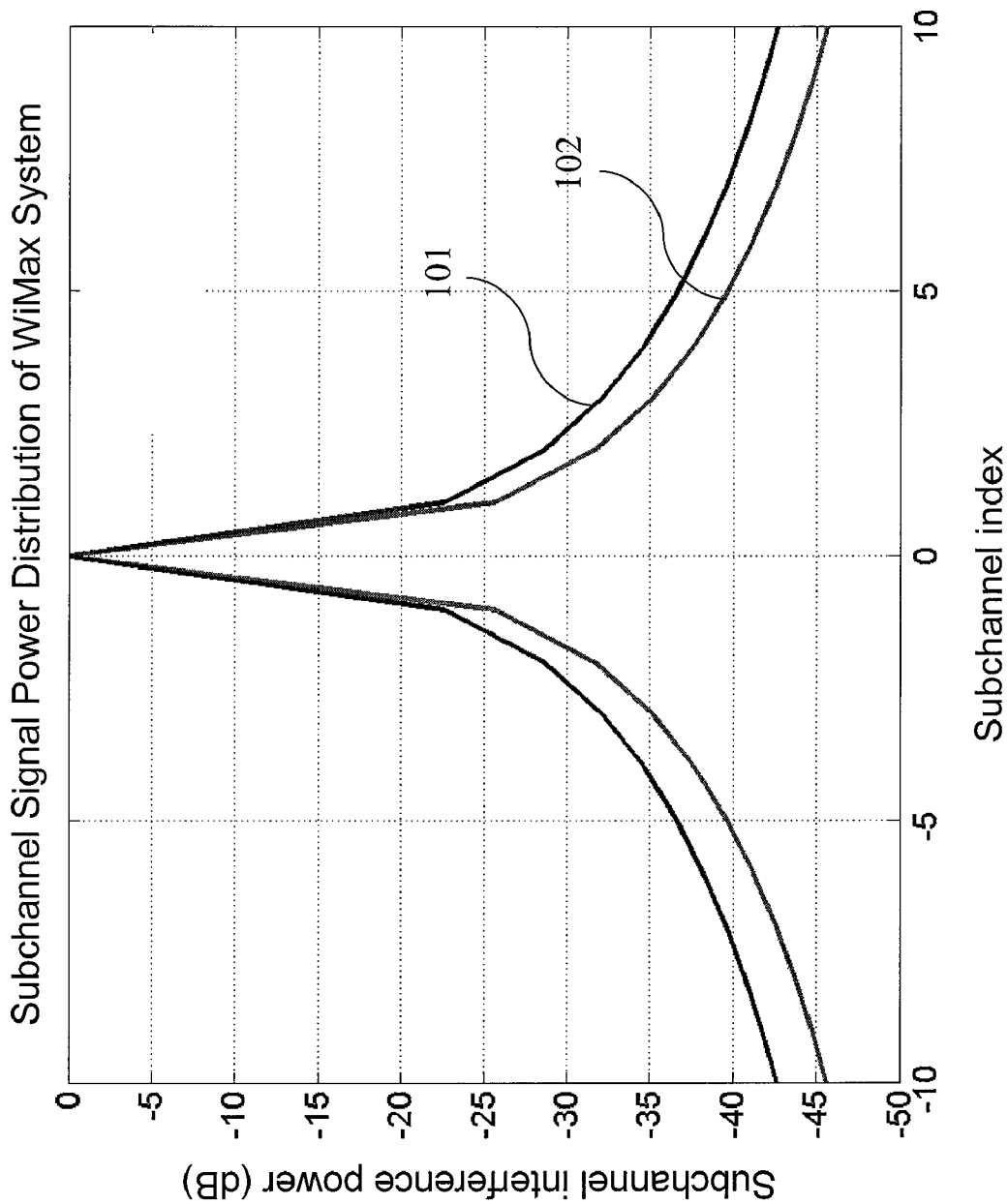
FIG. 1A is a graph illustrating the subchannel signal power distribution in a Worldwide Interoperability for Microwave Access (WiMAX) system.

Reference will now be made in detail to the present preferred embodiments of the present disclosure, examples of which are illustrated in the accompanying drawings. Wherever possible, the same reference numbers are used in the drawings and the description to refer to the same or like parts.

The present disclosure provides a progressive parallel interference canceller (PPIC) and a method and a receiver thereof, wherein each subchannel interference reconstruction signal is reconstructed through multiple iterations, and a corresponding subchannel interference reconstruction signal is subtracted from each subchannel frequency-domain reception signal to obtain a subchannel frequency-domain signal.

FIG. 1A is a graph illustrating the subchannel signal power distribution in a Worldwide Interoperability for Microwave Access (WiMAX) system, wherein the abscissa represents the subchannel index, and the ordinate represents the subchannel signal power (dB). Referring to FIG. 1A, the curve 102 is obtained at a mobiling velocity of 350 km/h (the product of the Doppler shift $f_d$ and the orthogonal frequency-division multiplexing (OFDM) modulation symbol period $T_s$ is 0.07), and the curve 101 is obtained at a mobiling velocity of 500 km/h (where $f_d \times T_s = 0.1$). As shown in FIG. 1A, the maximum value of the subchannel signal power falls around where the subchannel index is 0. Besides, as shown in FIG. 1A, the greater the mobiling velocity (i.e., $f_d \times T_s$) is, the greater the subchannel signal power at where the subchannel indexes is not 0 is. Accordingly, the greater the mobiling velocity is, the more serious the subchannel interference is.

To be specific, when the mobiling velocity is 0, the signals only fall at where the subchannel index is 0. When the mobiling velocity increases, the signals are distributed to and become interference at where the subchannel index is not 0, and the interference increases along with the mobiling velocity. Serious subchannel interference with higher mobiling velocity may even cause a receiver to misunderstand the wireless signals transmitted by a transmitter and accordingly greatly reduce the system performance. Thus, the receiver has to estimate the magnitude of a subchannel interference and cancels the subchannel interference to reduce the probability of misunderstanding wireless signals transmitted by the transmitter.

Figure 1B:
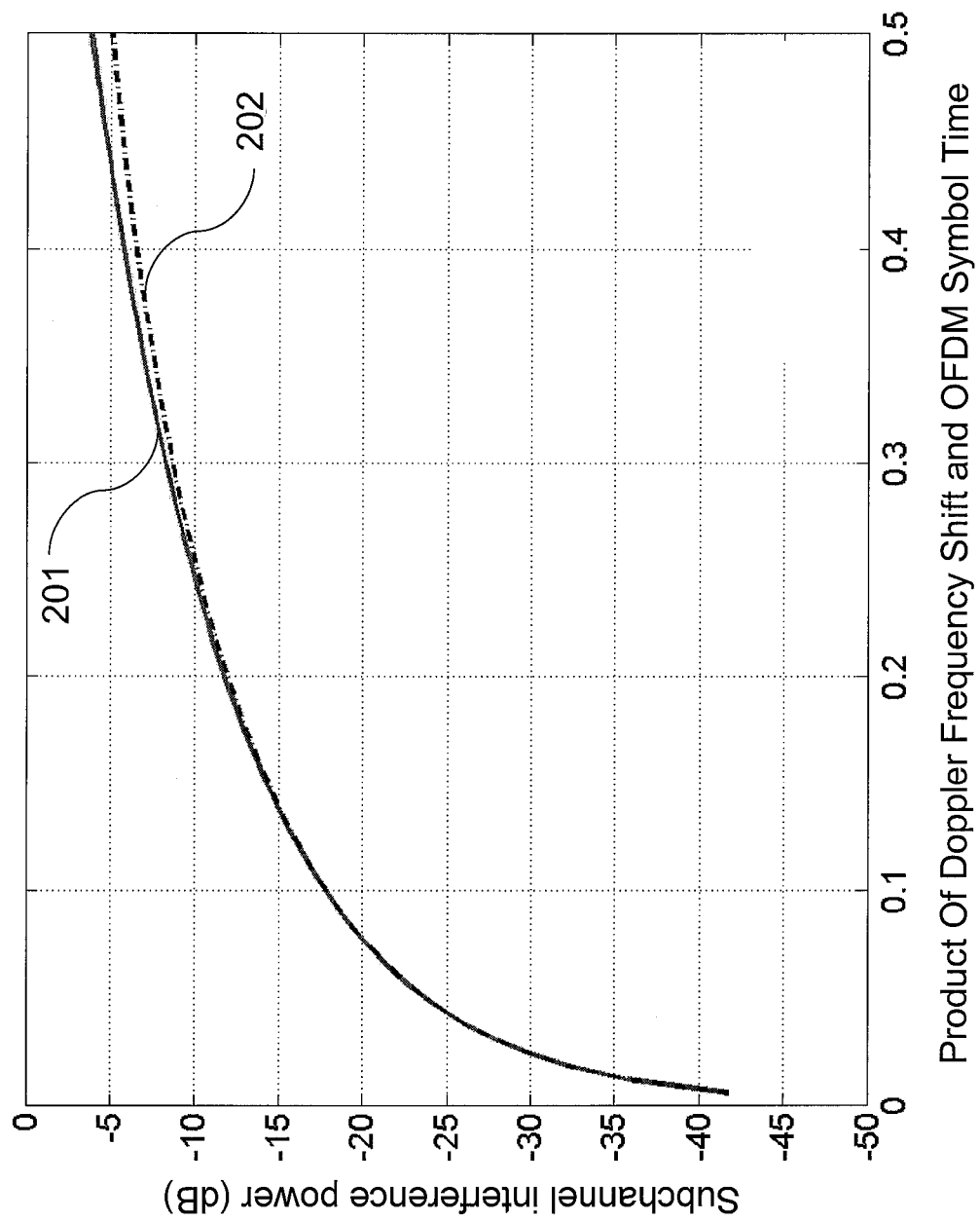
FIG. 1B is a graph illustrating the subchannel interference power in a WiMax system.

FIG. 1B is a graph illustrating the subchannel interference power in a WiMax system, wherein the abscissa represents the value of $f_d \times T_s$, and the ordinate represents the subchannel interference power (dB). Referring to FIG. 1B, the curve 201 represents an upper bound curve obtained through theoretical calculation, and the curve 202 represents a lower bound curve obtained through theoretical calculation. As shown in FIG. 1B, the greater the mobiling velocity (i.e., $f_d \times T_s$) is, the more serious the subchannel interference is. Generally speaking, when the mobiling velocity exceeds 300 km/h, the signal interference noise ratio (SINR) is restricted at about 20 dB. Thus, the bit error rate (BER) of the entire communication system cannot be reduced no matter how great the signal to noise ratio (SNR) is.

The signal on a subchannel is mainly interfered by several adjacent subchannels. Accordingly, the present disclosure provides a PPIC. The PPIC cancels interference signals on each subchannel through iterations, and during an $i^{th}$ iteration, the PPIC cancels the subchannel interference produced by signals on $(2 \times i - 2)$ adjacent subchannels. Below, the PPIC and a method and a receiver thereof provided by the present disclosure will be described in detail.

Figure 2:
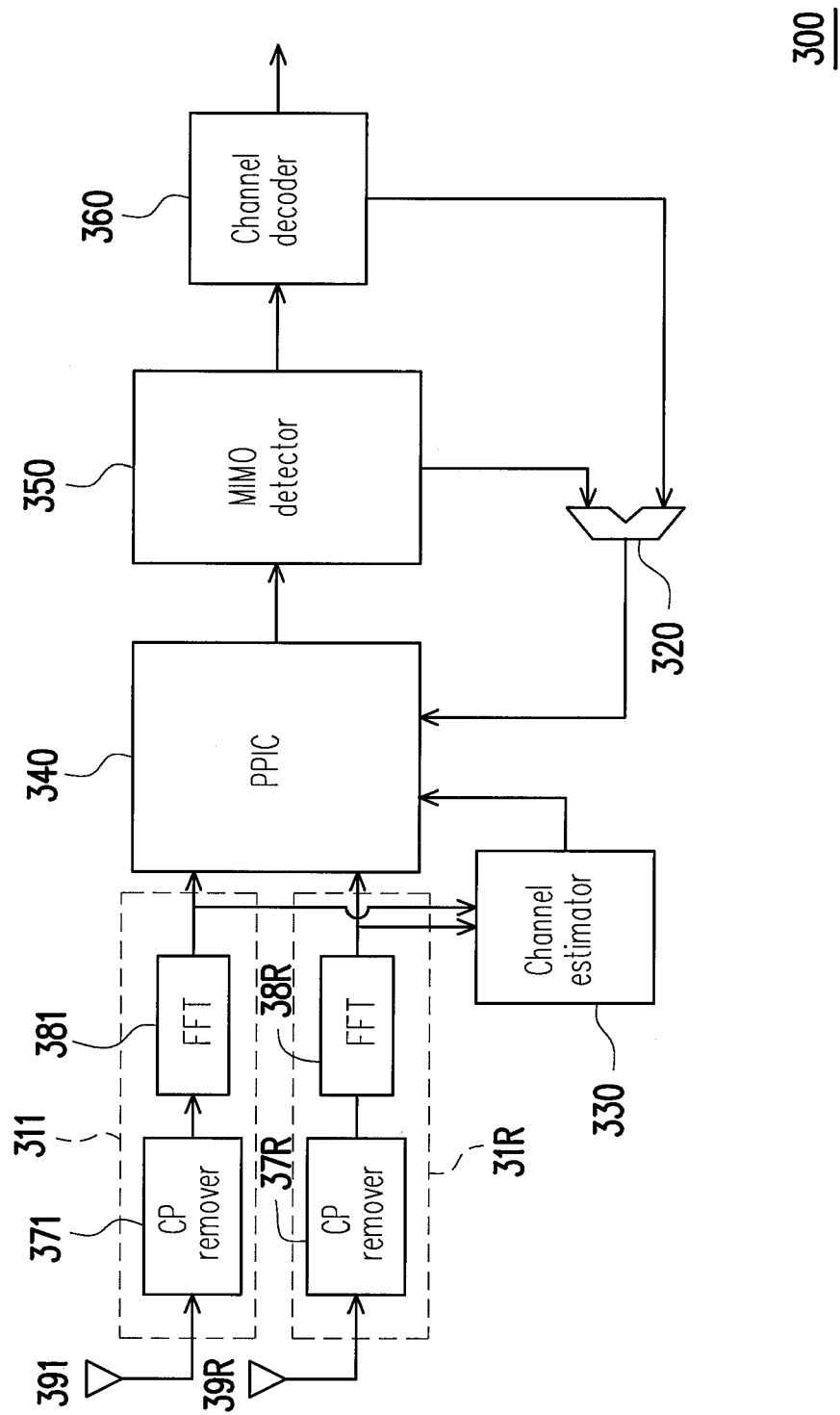
FIG. 2 is a system block diagram of a receiver 300 in a multiple input multiple output (MIMO) communication system based on the orthogonal frequency-division multiplexing (OFDM) modulation technique according to an exemplary embodiment of the present disclosure.

FIG. 2 is a system block diagram of a receiver 300 in a multiple input multiple output (MIMO) communication system based on the OFDM modulation technique according to an exemplary embodiment of the present disclosure. In the present exemplary embodiment, a transmitter in a MIMO communication system based on the OFDM modulation technique has T transmitting antennas, and the modulation method is to modulate M bits into a subchannel frequency-domain transmission signal $S_{t,k}$ (i.e., the bit modulation order is M), wherein the subchannel frequency-domain transmission signal $S_{t,k}$ represents a $k^{th}$ subchannel frequency-domain transmission signal to be transmitted by the $t^{th}$ transmitting antenna, t is an integer between 1 and T, k is an integer between 0 and (N−1), and N is the number of subchannels in the MIMO communication system.

Referring to FIG. 2, the receiver 300 includes a plurality of receiving antennas 391~39R, a plurality of OFDM demodulators 311~31R, a PPIC 340, a channel estimator 330, a multiplexer 320, a MIMO detector 350, and a channel decoder 360. The OFDM demodulator 31r includes a cyclic prefix (CP) remover 37r and a fast Fourier transformer (FFT) 38r, wherein r is an integer between 1 and R. The receiving antenna 39r is coupled to the CP remover 37r, and the CP remover 37r is coupled to the FFT 38r. The PPIC 340 is coupled to the OFDM demodulators 311~31R, and the channel estimator 330 is coupled to the PPIC 340 and the OFDM demodulators 311~31R. The multiplexer 320 is coupled to the MIMO detector 350, the channel decoder 360, and the PPIC 340, the MIMO detector 350 is coupled to the PPIC 340, and the channel decoder 360 is coupled to the MIMO detector 350.

A time-domain sampling signal $S_{t,u}$ to be transmitted by a transmitter through the $t^{th}$ transmitting antenna can be expressed as:

$$S_{t,u} = \frac{1}{N}\sum_{k=0}^{N-1} S_{t,k} e^{j\frac{2\pi ku}{N}}$$

$$u = 0 \sim N-1, t = 1 \sim T$$

Next, the transmitter adds a CP to N time-domain sampling signals to be transmitted through the same transmitting antenna, wherein the $u^{th}$ sample $\tilde{S}_{t,u}$ of the CP in the OFDM symbol to be transmitted by the $t^{th}$ transmitting antenna is expressed as:

$$\tilde{S}_{t,u} = S_{t,N-N_G+u}\ 0 \leq u \leq N_G - 1,$$

wherein $N_G$ represents the length of a guard interval. Finally, the $t^{th}$ transmitting antenna transmits the OFDM symbol with the CP to the wireless channel.

The receiving antenna 39r receives the OFDM symbol transmitted by the transmitter from the wireless channel. The time-domain sampling signal in the OFDM symbol received by the receiving antenna 39r is a summation signal composed of the time-domain sampling signals transmitted by the transmitting antennas through the wireless channel. The CP remover 37r removes the CP in the OFDM symbol received by the receiving antenna 39r. The $u^{th}$ time-domain sampling signal $y_{r,u}$ corresponding to the $r^{th}$ receiving antenna in the OFDM symbol after the CP is removed can be expressed as:

$$y_{r,u} = \sum_{t=1}^{T}\sum_{l=0}^{N_G} h_{r,t,l}^{(u)} S_{t,((u-l))_N} + z_{r,u}\ 0 \leq u \leq N-1, 1 \leq r \leq R$$

wherein $h_{r,t,l}^{(u)}$ represents a $l^{th}$ channel tap of a channel impulse response from the $t^{th}$ transmitting antenna to the $r^{th}$ receiving antenna at a $u^{th}$ sampling time, $((\cdot))_N$ represents a calculation of dividing by N to obtain the remainder, and $z_{r,u}$ represents a $u^{th}$ sample value corresponding to the additive white Gaussian noise (AWGN) of the $r^{th}$ receiving antenna, wherein the average value and the variance of the AWGN are respectively 0 and $\sigma_z^2$.

Next, the FFT 38r receives a plurality of time-domain sampling signals corresponding to the $r^{th}$ receiving antenna and performs a fast Fourier transform to the time-domain sampling signals to generate a $k^{th}$ subchannel frequency-domain reception signal $Y_{r,k}$ corresponding to the $r^{th}$ receiving antenna, wherein the subchannel frequency-domain reception signal $Y_{r,k}$ can be expressed as:

$$Y_{r,k} = \sum_{u=0}^{N-1} y_{r,u} e^{-j\frac{2\pi ku}{N_c}}\ 0 \leq k \leq N-1$$

$$= \sum_{t=1}^{T} H_{r,t,k}^0 S_{t,k} + \underbrace{\sum_{t=1}^{T}\sum_{d=1}^{N-1} H_{r,t,k}^d S_{t,((k-d))_N}}_{ICI\ term} + Z_{r,k}$$

wherein $Z_{r,k}$ represents the AWGN sample value of a $k^{th}$ subchannel corresponding to the $r^{th}$ receiving antenna. There are three signal components in foregoing expression, wherein the first signal component is a subchannel frequency-domain signal which is used by the receiver 300 for resolving the information transmitted by the transmitter, the second signal component is a subchannel interference signal, and the third signal component is the AWGN. Additionally, $F_l(k)$ is defined as a FFT of the time variation of the $l^{th}$ channel tap, and $F_l(k)$ is expressed as:

$$F_l(k) = \sum_{u=0}^{N-1} h_{r,t,l}^{(u)} e^{-j\frac{2\pi ku}{N_c}}\ 0 \leq l \leq N_G\ \&\ 0 \leq k \leq N-1$$

Accordingly, the subchannel interference coefficient $H_{r,t,k}^d$ in the subchannel interference signal is expressed as:

$$H_{r,t,k}^d = \frac{1}{N}\sum_{l=0}^{N_G} F_l(d) e^{-j\frac{2\pi l(k-d)}{N}}\ 0 \leq k, d \leq N_c - 1,$$

and the subchannel interference coefficient $H_{r,t,k}^0$ is expressed as:

$$H_{r,t,k}^0 = \frac{1}{N}\sum_{l=0}^{N_G}\sum_{u=0}^{N-1} h_{r,t,l}^{(u)} e^{-j\frac{2\pi lk}{N}}$$

$$= \sum_{l=0}^{N_G} h_{r,t,l}^{ave} e^{-j\frac{2\pi lk}{N}}$$

wherein $h_{r,t,l}^{ave}$ represents an average value of the $l^{th}$ channel tap in the OFDM symbol during a valid time period.

The PPIC 340 receives a plurality of subchannel frequency-domain reception signals output by the FFTs 381~38R and reconstructs each subchannel interference signal according to a plurality of subchannel frequency-domain estimation signals output by the MIMO detector 350 or the channel decoder 360. To be specific, the channel estimator 330 estimates that a plurality of subchannel impulse responses produced by the wireless channel can generate a plurality of coefficients for reconstructing the subchannel interference signals. The PPIC 340 receives these coefficients and reconstructs each subchannel interference signal according to the subchannel frequency-domain estimation signals and the coefficients. Next, the PPIC 340 subtracts the corresponding subchannel interference signals from the received subchannel frequency-domain reception signals to obtain the subchannel frequency-domain signals. After that, the PPIC 340 sends the subchannel frequency-domain signals to the MIMO detector 350.

The multiplexer 320 decides whether to let the subchannel frequency-domain estimation signals output by the MIMO detector 350 or the channel decoder 360 to enter the PPIC 340. It should be noted that the multiplexer 320 is not an essential element of the receiver 300, and those having ordinary knowledge in the art should understand that the multiplexer 320 may be removed, and the output terminal of the MIMO detector 350 or the channel decoder 360 for outputting the subchannel frequency-domain estimation signals may be directly coupled to the PPIC 340 after the multiplexer 320 is removed.

The MIMO detector 350 receives the subchannel frequency-domain signals output by the PPIC 340 and obtains a plurality of subchannel frequency-domain estimation signals according to the subchannel frequency-domain signals, wherein the subchannel frequency-domain estimation signals are sent back to the PPIC 340 so that the PPIC 340 can reconstruct the subchannel interference signals according to the subchannel frequency-domain estimation signals. The channel decoder 360 receives a plurality of bits that are generated by the MIMO detector 350 according to a plurality of subchannel frequency-domain signals. The channel decoder 360 decodes these bits to generate a plurality of decoded bits for a backend circuit of the receiver 300. In addition, the channel decoder 360 further generates a plurality of subchannel frequency-domain estimation signals for the PPIC 340 according to the decoded bits.

It can be understood from foregoing description that the PPIC 340, the MIMO detector 350, and the channel decoder 360 can perform multiple iterations. Through these iterations, the bits carried by the subchannel frequency-domain signals are made almost equivalent to the bits transmitted by the transmitter. Below, the iterations performed by the PPIC 340, the MIMO detector 350, and the channel decoder 360 will be described in detail.

Figure 3:
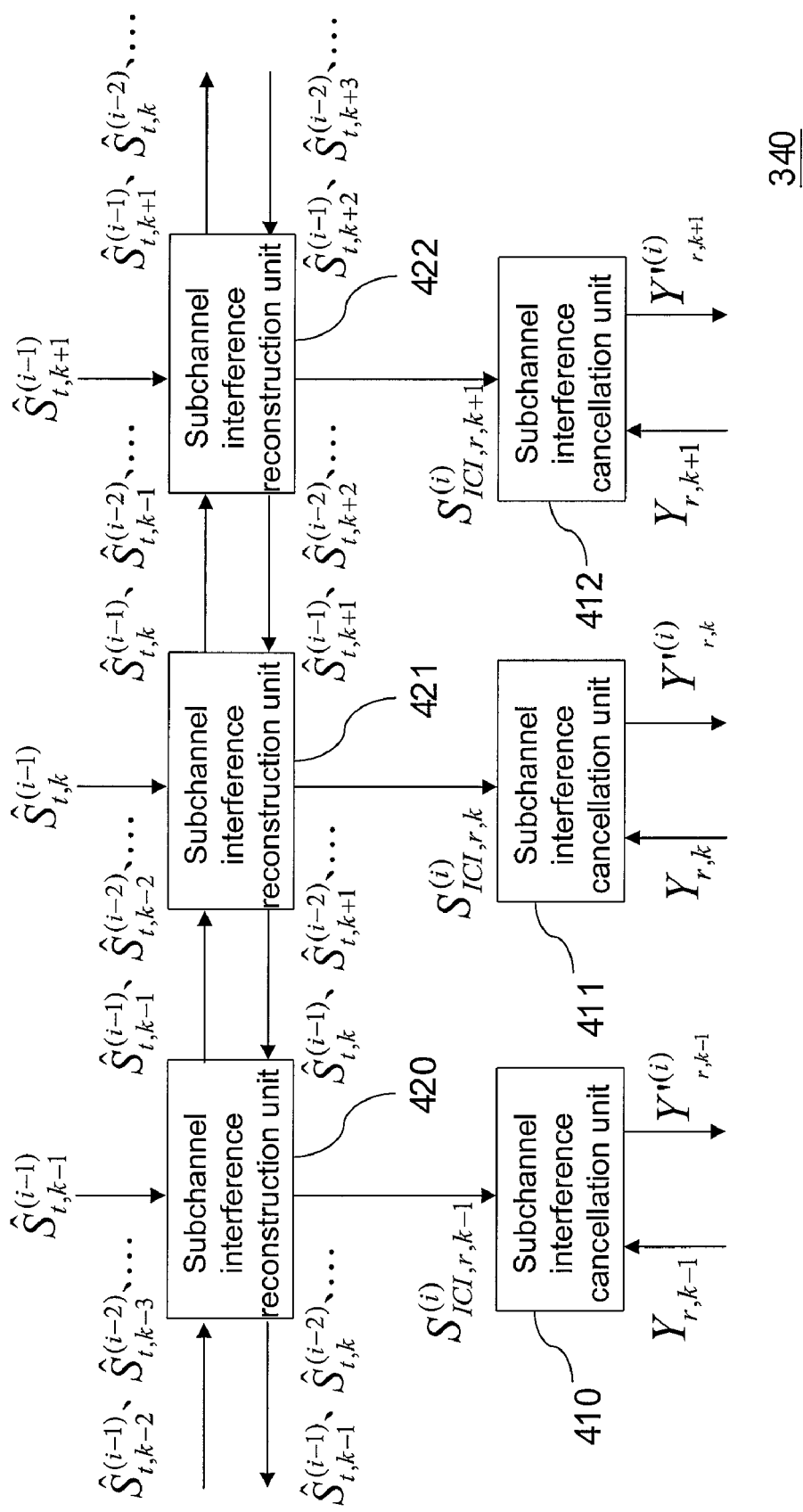
FIG. 3 is a system block diagram illustrating part of the circuit of a progressive parallel interference canceller (PPIC) 340 according to an exemplary embodiment of the present disclosure.

FIG. 3 is a system block diagram illustrating part of the circuit of the PPIC 340 according to an exemplary embodiment of the present disclosure. Referring to FIG. 3, the PPIC 340 includes a plurality of subchannel interference reconstruction units and a plurality of subchannel interference cancellation units, such as the subchannel interference reconstruction units 420~422 and the subchannel interference cancellation units 410~412 corresponding to the $(k-1)^{th}$~$(k+1)^{th}$ subchannels (assuming that $(k-1)$ is greater than or equal to 0 and $(k+1)$ is smaller than N) of the $r^{th}$ receiving antenna, as shown in FIG. 3. The subchannel interference reconstruction units 420~422 are respectively coupled to the subchannel interference cancellation units 410~412. Even though only part of the circuit of the PPIC 340 is illustrated in FIG. 3, the entire circuit of the PPIC 340 can be deduced according to FIG. 3. Similarly, even though only the iterations performed by the subchannel interference reconstruction units 420~422 and the subchannel interference cancellation units 410~412 are described, the iterations performed by the other subchannel interference reconstruction units and subchannel interference cancellation units can be deduced accordingly.

During the first iteration, because the MIMO detector 350 and the channel decoder 360 have not estimated the bit probabilities to generate the subchannel frequency-domain estimation signals $\hat{S}_{t,k-1}^{(0)}$, $\hat{S}_{t,k}^{(0)}$, and $\hat{S}_{t,k+1}^{(0)}$ yet, the subchannel interference reconstruction units 420~422 respectively consider the subchannel frequency-domain estimation signals $\hat{S}_{t,k-1}^{(0)}$, $\hat{S}_{t,k}^{(0)}$, and $\hat{S}_{t,k+1}^{(0)}$ as 0, wherein the subchannel frequency-domain estimation signal $\hat{S}_{t,k}^{(0)}$ represents a predetermined $k^{th}$ subchannel frequency-domain estimation signal corresponding to the $t^{th}$ transmitting antenna, and the subchannel frequency-domain estimation signals $\hat{S}_{t,k-1}^{(0)}$ and $\hat{S}_{t,k+1}^{(0)}$ can be deduced accordingly. During the first iteration, the subchannel interference reconstruction units 420~422 directly preset the subchannel interference reconstruction signals $S_{ICI,r,k-1}^{(1)}$, $S_{ICI,r,k}^{(1)}$, and $S_{ICI,r,k+1}^{(1)}$ to 0, wherein the subchannel interference reconstruction signal $S_{ICI,r,k}^{(1)}$ represents the $k^{th}$ subchannel interference reconstruction signal corresponding to the $r^{th}$ receiving antenna generated during the first iteration.

The subchannel interference cancellation units 410~412 respectively receive the subchannel frequency-domain reception signals $Y_{r,k-1}$, $Y_{r,k}$, and $Y_{r,k+1}$. During the first iteration, because the subchannel interference reconstruction signals $S_{ICI,r,k-1}^{(1)}$, $S_{ICI,r,k}^{(1)}$, and $S_{ICI,r,k+1}^{(1)}$ are preset to 0, the subchannel frequency-domain signals $Y'_{r,k-1}^{(1)}$, $Y'_{r,k}^{(1)}$, and $Y'_{r,k+1}^{(1)}$ output by the subchannel interference cancellation units 410~412 are equivalent to the subchannel frequency-domain reception signals $Y_{r,k-1}$, $Y_{r,k}$, and $Y_{r,k+1}$, wherein the subchannel frequency-domain signal $Y'_{r,k}^{(1)}$ represents the $k^{th}$ subchannel frequency-domain signal corresponding to the $r^{th}$ receiving antenna generated during the first iteration.

During the first iteration, the MIMO detector 350 or the channel decoder 360 estimates the bit probabilities according to the subchannel frequency-domain signals $Y'_{1,k}^{(1)}$, $Y'_{2,k}^{(1)}$, ..., and $Y'_{R,k}^{(1)}$ to generate the subchannel frequency-domain estimation signal $\hat{S}_{t,k}^{(1)}$. Similarly, the MIMO detector 350 or the channel decoder 360 estimates the bit probabilities to generate the subchannel frequency-domain estimation signals $\hat{S}_{t,k-1}^{(1)}$ and $\hat{S}_{t,k+1}^{(1)}$.

Next, the subchannel interference reconstruction unit 421 generates the subchannel interference reconstruction signal $S_{ICI,r,k}^{(i)}$ according to $(2 \times i - 2)$ subchannel frequency-domain estimation signals $\hat{S}_{t,((k-i+1))_N}^{(1)}$, $\hat{S}_{t,((k-i+2))_N}^{(2)}$, ..., $\hat{S}_{t,((k-2))_N}^{(i-2)}$, $\hat{S}_{t,((k-1))_N}^{(i-1)}$, $\hat{S}_{t,((k+1))_N}^{(i-1)}$, $\hat{S}_{t,((k+2))_N}^{(i-2)}$, ..., $\hat{S}_{t,((k+i-2))_N}^{(2)}$, $\hat{S}_{t,((k+i-1))_N}^{(1)}$ during the $i^{th}$ iteration, wherein i is an integer greater than 1, the subchannel frequency-domain estimation signal $\hat{S}_{t,q}^{(x)}$ represents the $q^{th}$ subchannel frequency-domain estimation signal corresponding to the $t^{th}$ transmitting antenna generated during the $x^{th}$ iteration, x is an integer between 1 and $(i-1)$, $q=k-i+x$ or $q=k+i-x$, and the subchannel interference reconstruction signal $S_{ICI,r,k}^{(i)}$ represents the $k^{th}$ subchannel interference reconstruction signal corresponding to the $r^{th}$ receiving antenna generated during the $i^{th}$ iteration. Besides, the $i^{th}$ iteration performed by the subchannel interference reconstruction units 420 and 422 can be deduced accordingly.

To be specific, the method for generating the subchannel interference reconstruction signal $S_{ICI,r,k}^{(i)}$ can be referred to the expression of the subchannel interference signal in aforementioned expression of the subchannel frequency-domain reception signal $Y_{r,k}$, and accordingly the subchannel interference reconstruction signal $S_{ICI,r,k}^{(i)}$ can be expressed as:

$$S_{ICI,r,k}^{(i)} = H_{r,t,k}^{1} \cdot \hat{S}_{t,((k-1))_N}^{(i-1)} + H_{r,t,k}^{2} \cdot \hat{S}_{t,((k-2))_N}^{(i-2)} + \ldots + r_{r,t,k}^{N-2} \cdot \hat{S}_{t,((k-2))_N}^{(i-2)} + H_{r,t,k}^{N-1} \cdot \hat{S}_{t,((k+1))_N}^{(i-1)}$$

If it is assumed that the subchannel impulse responses estimated by the channel estimator 330 are perfect, the coefficients $H_{r,t,k}^{1} \sim H_{r,t,k}^{N-1}$ generated by the channel estimator 330 also have ideal values. Thus, the subchannel interference reconstruction signal $S_{ICI,r,k}^{(i)}$ is close to the $k^{th}$ practical subchannel interference reconstruction signal corresponding to the $r^{th}$ receiving antenna, and along with the increase of the value of i, the subchannel interference reconstruction signal $S_{ICI,r,k}^{(i)}$ will get closer to the $k^{th}$ practical subchannel interference reconstruction signal corresponding to the $r^{th}$ receiving antenna.

During the $i^{th}$ iteration, the subchannel interference cancellation unit 411 obtains the subchannel frequency-domain signal $Y'_{r,k}^{(i)}$ according to the subchannel frequency-domain reception signal $Y_{r,k}$ and the subchannel interference reconstruction signal $S_{ICI,r,k}^{(i)}$. To be specific, the subchannel frequency-domain signal $Y'_{r,k}^{(i)}$ is equal to the subchannel frequency-domain reception signal $Y_{r,k}$ minus the subchannel interference reconstruction signal $S_{ICI,r,k}^{(i)}$, wherein the subchannel frequency-domain signal $Y'_{r,k}^{(i)}$ represents the $k^{th}$ subchannel frequency-domain signal corresponding to the $r^{th}$ receiving antenna generated during the $i^{th}$ iteration. In addition, the $i^{th}$ iteration performed by the subchannel interference cancellation units 410 and 412 can be deduced accordingly.

It should be mentioned that in the exemplary embodiment illustrated in FIG. 3, the subchannel interference reconstruction units 420~422 respectively have a memory. Taking the subchannel interference reconstruction unit 421 as an example, during the $i^{th}$ iteration, the subchannel interference reconstruction unit 420 receives and stores the subchannel frequency-domain estimation signal $\hat{S}_{t,k}^{(i-1)}$. During the $i^{th}$ iteration, the subchannel interference reconstruction unit 421 transmits the subchannel frequency-domain estimation signal $\hat{S}_{t,k}^{(i-1)}$ currently stored in the memory to the subchannel interference reconstruction units 420 and 422.

Besides, during the $i^{th}$ iteration, the subchannel interference reconstruction unit 421 transmits the subchannel frequency-domain estimation signals $\hat{S}_{t,((k-i+2))_N}^{(1)}$, $\hat{S}_{t,((k-i+3))_N}^{(2)}, \ldots,$ and $\hat{S}_{t,((k-1))_N}^{(i-2)}$ that are stored in the memory during the previous (i−2) iterations to the subchannel interference reconstruction unit 422, and the subchannel interference reconstruction unit 421 transmits the subchannel frequency-domain estimation signals $\hat{S}_{t,((k-i+2))_N}^{(1)}$, $\hat{S}_{t,((k+i-3))_N}^{(2)}, \ldots,$ and $\hat{S}_{t,((k+1))_N}^{(i-2)}$ that are stored in the memory during the previous (i−2) iterations to the subchannel interference reconstruction unit 420.

In addition, during the $i^{th}$ iteration, the subchannel interference reconstruction unit 421 receives the subchannel frequency-domain estimation signals $\hat{S}_{t,((k-i+1))_N}^{(1)}$, $\hat{S}_{t,((k-i+2))_N}^{(2)}, \ldots, \hat{S}_{t,((k-2))_N}^{(i-2)}, \hat{S}_{t,((k-1))_N}^{(i-1)}$ from the subchannel interference reconstruction unit 420 and stores the subchannel frequency-domain estimation signals $\hat{S}_{t,((k-i+1))_N}^{(1)}, \hat{S}_{t,((k-i+2))_N}^{(2)}, \ldots, \hat{S}_{t,((k-2))_N}^{(i-2)}, \hat{S}_{t,((k-1))_N}^{(i-1)}$ into the memory. Similarly, the subchannel interference reconstruction unit 421 receives the subchannel frequency-domain estimation signals $\hat{S}_{t,((k+1))_N}^{(i-1)}, \hat{S}_{t,((k+2))_N}^{(i-2)}, \ldots, \hat{S}_{t,((k+i-2))_N}^{(2)}, \hat{S}_{t,((k+i-1))_N}^{(1)}$ from the subchannel interference reconstruction unit 422 and stores the subchannel frequency-domain estimation signals $\hat{S}_{t,((k+1))_N}^{(i-1)}, \hat{S}_{t,((k+2))_N}^{(i-2)}, \ldots, \hat{S}_{t,((k+i-2))_N}^{(2)}, \hat{S}_{t,((k+i-1))_N}^{(1)}$ into the memory.

Figure 4A:
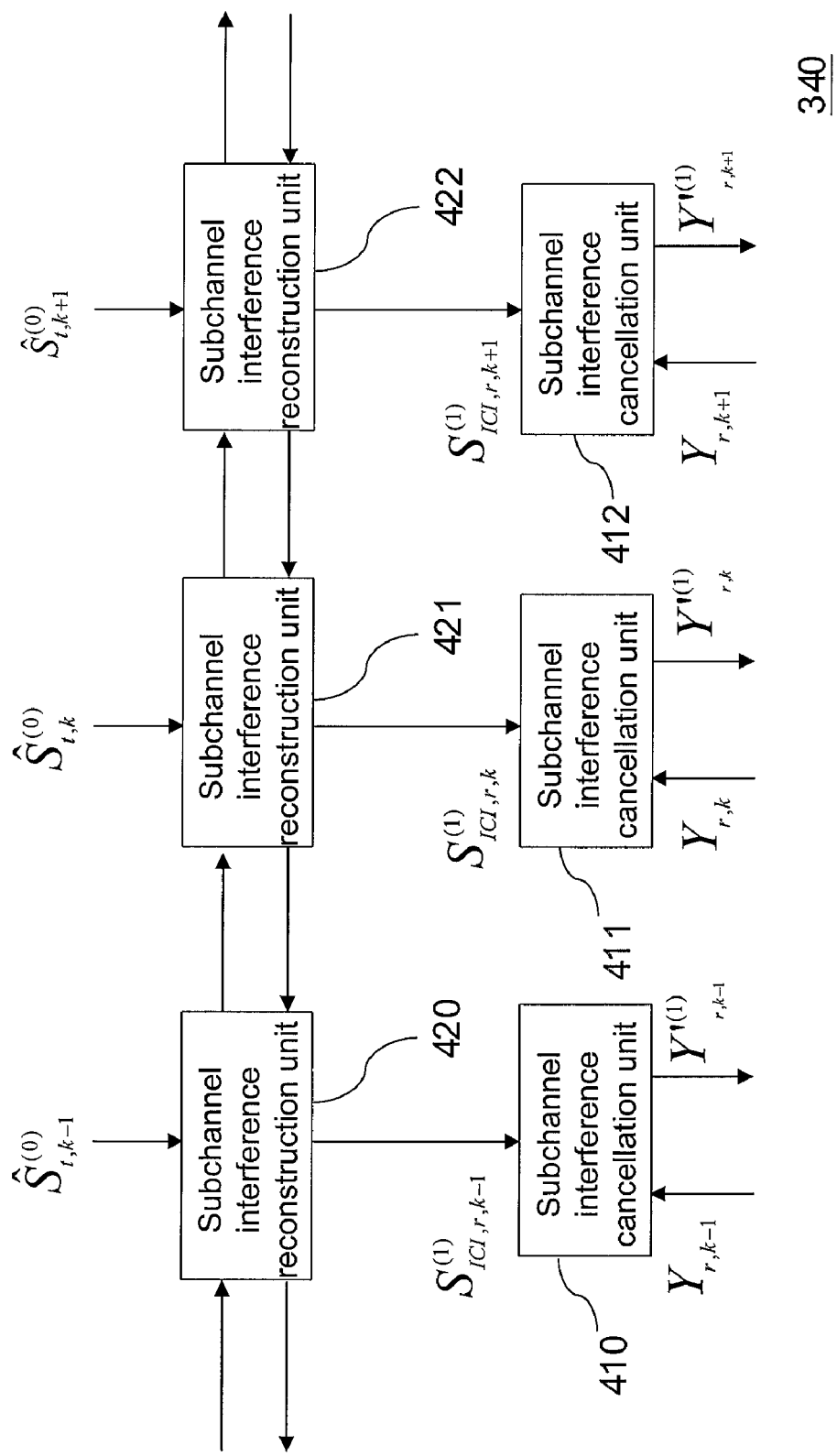
FIGS. 4A~4C are diagrams respectively illustrating how subchannel interference cancellation units 410~412 and subchannel interference reconstruction units 420~422 perform a $1^{st}$ to a $3^{rd}$ iterations.
Figure 4B:
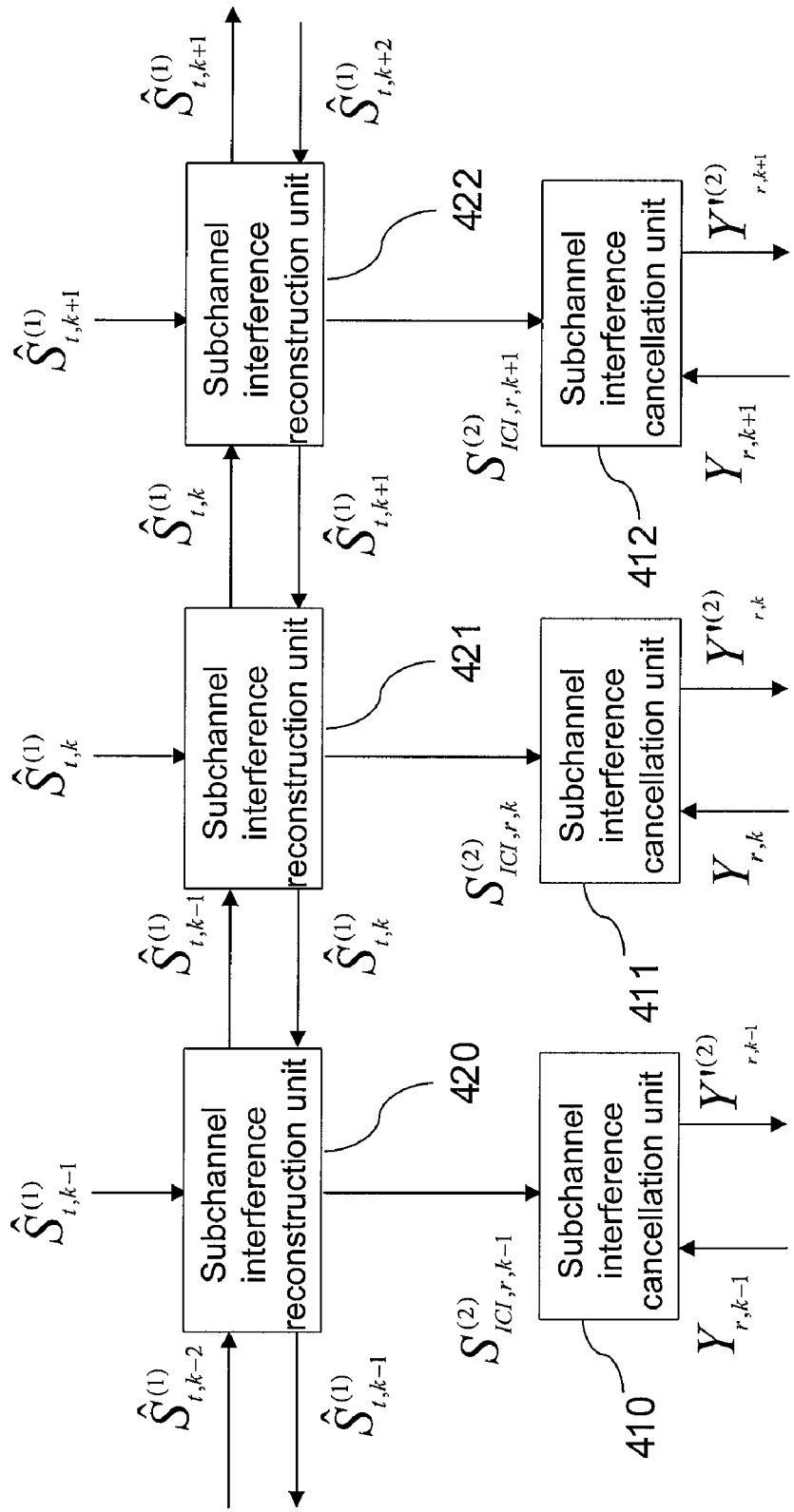
Figure 4C:
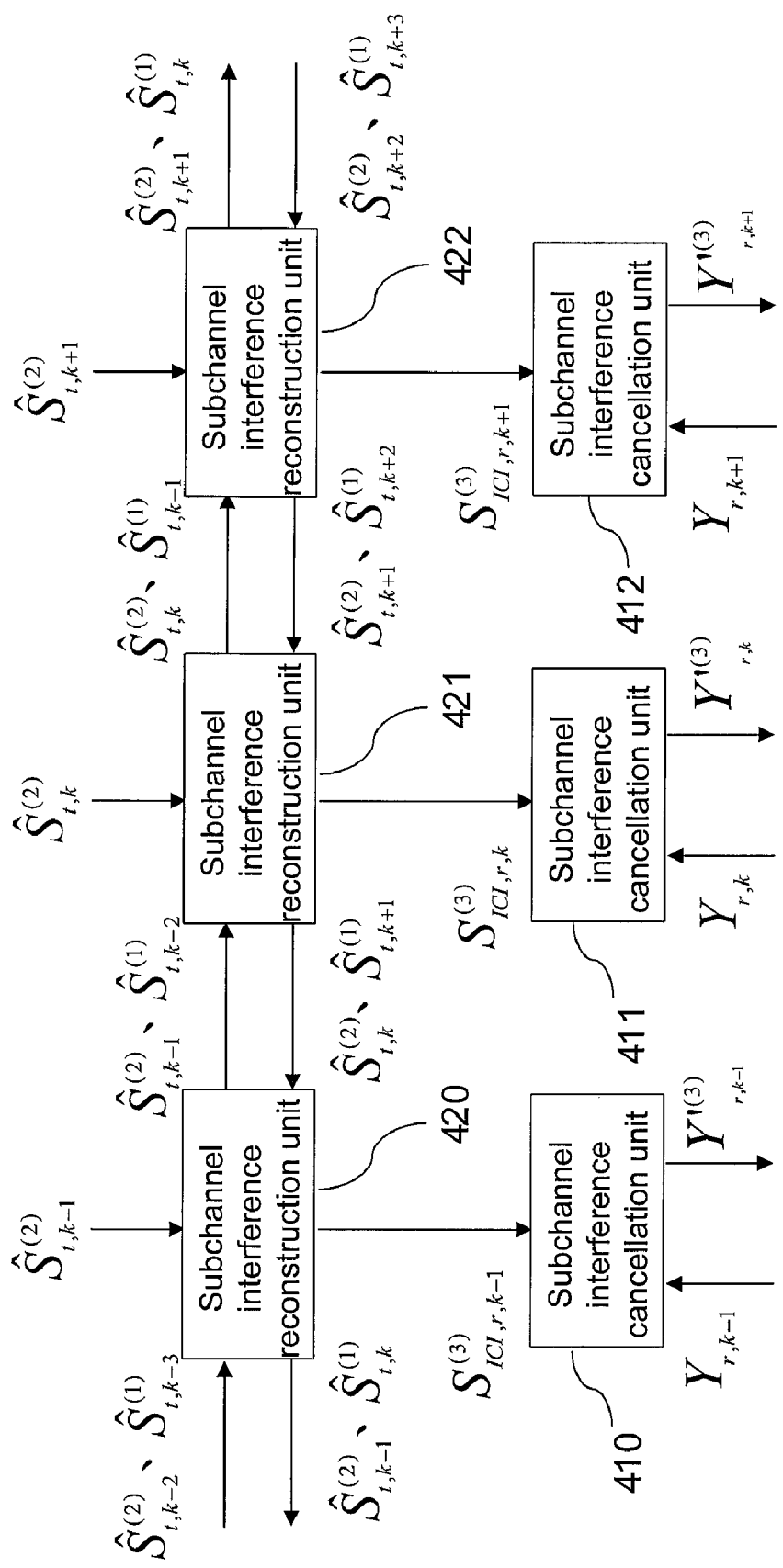

FIGS. 4A~4C are diagrams respectively illustrating how the subchannel interference cancellation units 410~412 and the subchannel interference reconstruction units 420~422 perform the first to the third iterations. Referring to FIG. 4A, during the first iteration, because the MIMO detector 350 and the channel decoder 360 have not estimated the bit probabilities to generate the subchannel frequency-domain estimation signals $\hat{S}_{t,k-1}^{(0)}, \hat{S}_{t,k}^{(0)},$ and $\hat{S}_{t,k+1}^{(0)}$, the subchannel interference reconstruction units 420~422 respectively consider the subchannel frequency-domain estimation signals $\hat{S}_{t,k-1}^{(0)}, \hat{S}_{t,k}^{(0)},$ and $\hat{S}_{t,k+1}^{(0)}$ as 0 and directly preset the subchannel interference reconstruction signals $S_{ICI,r,k-1}^{(1)}, S_{ICI,r,k}^{(1)},$ and $S_{ICI,r,k+1}^{(1)}$ to 0. The subchannel interference cancellation units 410~412 respectively receive the subchannel frequency-domain reception signals $Y_{r,k-1}, Y_{r,k},$ and $Y_{r,k+1}$ and outputs the subchannel frequency-domain signals $Y'_{r,k-1}^{(1)}, Y'_{r,k}^{(1)},$ and $Y'_{r,k+1}^{(1)}$, wherein the subchannel frequency-domain signals $Y'_{r,k-1}^{(1)}, Y'_{r,k}^{(1)},$ and $Y'_{r,k+1}^{(1)}$ are used for replacing the subchannel frequency-domain reception signals $Y_{r,k-1}, Y_{r,k},$ and $Y_{r,k+1}$.

It should be noted that the MIMO detector 350 works along with the PPIC 340 to perform the iterations. Thus, when the PPIC 340 performs the first iteration, the channel estimator 330 needs only to calculate the coefficients $H,r,t,0^0 \sim H,r,t,1023^0$ (assuming N is 1024), namely, to generate the following subchannel interference coefficient matrix:

Subcarrier Index $k$ $\begin{bmatrix} \text{Signal Term} & \text{Left 1st ICI Term} & \text{Left 2nd ICI Term} & \text{Right 2nd ICI Term} & \text{Right 1st ICI Term} \\ d=0 & d=1 & d=2 & d=1022 & d=1023 \\ H_{r,t,0}^0 & n.a. & n.a. & \ldots \ldots & n.a. & n.a. \\ H_{r,t,1}^0 & n.a. & n.a. & \ldots \ldots & n.a. & n.a. \\ \vdots & \vdots & \vdots & \ldots \ldots & \vdots & \vdots \\ \vdots & \vdots & \vdots & \ldots \ldots & \vdots & \vdots \\ H_{r,t,1022}^0 & n.a. & n.a. & \ldots \ldots & n.a. & n.a. \\ H_{r,t,1023}^0 & n.a. & n.a. & \ldots \ldots & n.a. & n.a. \end{bmatrix}$, wherein n.a. means that the corresponding coefficient is not to be generated.

Next, referring to FIG. 4B, during the second iteration, the subchannel interference reconstruction unit 421 generates the subchannel interference reconstruction signal $S_{ICI,r,k}^{(2)}$ according to two subchannel frequency-domain estimation signals $\hat{S}_{t,k-1}^{(1)}$ and $\hat{S}_{t,k+1}^{(1)}$. The subchannel interference cancellation unit 411 obtains the subchannel frequency-domain signal $Y'_{r,k}^{(2)}$ according to the subchannel frequency-domain reception signal $Y_{r,k}$ and the subchannel interference reconstruction signal $S_{ICI,r,k}^{(2)}$. Similarly, the subchannel interference reconstruction unit 420 generates the subchannel interference reconstruction signal $S_{ICI,r,k-1}^{(2)}$ according to two subchannel frequency-domain estimation signals $\hat{S}_{t,k-2}^{(1)}$ and $\hat{S}_{t,k}^{(1)}$ (assuming that (k−2) is greater than or equal to 0). The subchannel interference cancellation unit 410 obtains the subchannel frequency-domain signal $Y'_{r,k-1}^{(2)}$ according to the subchannel frequency-domain reception signal $Y_{r,k-1}$ and the subchannel interference reconstruction signal $S_{ICI,r,k-1}^{(2)}$. The subchannel interference reconstruction unit 422 generates the subchannel interference reconstruction signal $S_{ICI,r,k+1}^{(2)}$ according to two subchannel frequency-domain estimation signals $\hat{S}_{t,k}^{(1)}$ and $\hat{S}_{t,k+2}^{(1)}$ (assuming that (k+2) is smaller than N). The subchannel interference cancellation unit 412 obtains the subchannel frequency-domain signal $Y'_{r,k+1}{}^{(2)}$ according to the subchannel frequency-domain reception signal $Y_{r,k+1}$ and the subchannel interference reconstruction signal $S_{ICI,r,k+1}{}^{(2)}$.

During the second iteration, the channel estimator 330 needs only to calculate the coefficients $H_{r,t,0}{}^0 \sim H_{r,t,1023}{}^0$, $H_{r,t,0}{}^1 \sim H_{r,t,1023}{}^1$, and $H_{r,t,0}{}^{1023} \sim H_{r,t,1023}{}^{1023}$ (assuming N is 1024), namely, to generate the following subchannel interference coefficient matrix:

Subcarrier Index $k$
$$\begin{bmatrix} \overset{d=0}{\underset{Term}{Signal}} & \overset{d=1}{\underset{ICI\ Term}{Left\ 1^{st}}} & \overset{d=2}{\underset{ICI\ Term}{Left\ 2^{nd}}} & & & \overset{d=1022}{\underset{ICI\ Term}{Right\ 2^{nd}}} & \overset{d=1023}{\underset{ICI\ Term}{Right\ 1^{st}}} \\ H_{r,t,0}^0 & H_{r,t,0}^1 & n.a. & \cdots & \cdots & n.a. & H_{r,t,0}^{1023} \\ H_{r,t,1}^0 & H_{r,t,1}^1 & n.a. & \cdots & \cdots & n.a. & H_{r,t,1}^{1023} \\ \vdots & \vdots & \vdots & \cdots & \cdots & \vdots & \vdots \\ \vdots & \vdots & \vdots & \cdots & \cdots & \vdots & \vdots \\ H_{r,t,1022}^0 & H_{r,t,1022}^1 & n.a. & \cdots & \cdots & n.a. & H_{r,t,1022}^{1023} \\ H_{r,t,1023}^0 & H_{r,t,1023}^1 & n.a. & \cdots & \cdots & n.a. & H_{r,t,1023}^{1023} \end{bmatrix}$$

Next, referring to FIG. 4C, during the third iteration, the subchannel interference reconstruction unit 421 generates the subchannel interference reconstruction signal $S_{ICI,r,k}{}^{(3)}$ according to four subchannel frequency-domain estimation signals $\hat{S}_{t,k-2}{}^{(1)}$, $\hat{S}_{t,k-1}{}^{(2)}$, $\hat{S}_{t,k+1}{}^{(2)}$, and $\hat{S}_{t,k-2}{}^{(1)}$. The subchannel interference cancellation unit 411 obtains the subchannel frequency-domain signal $Y'_{r,k}{}^{(3)}$ according to the subchannel frequency-domain reception signal $Y_{r,k}$ and the subchannel interference reconstruction signal $S_{ICI,r,k}{}^{(3)}$. Similarly, the subchannel interference reconstruction unit 420 generates the subchannel interference reconstruction signal $S_{ICI,r,k-1}{}^{(3)}$ according to four subchannel frequency-domain estimation signals $\hat{S}_{t,k-3}{}^{(1)}$, $\hat{S}_{t,k-2}{}^{(2)}$, $\hat{S}_{t,k}{}^{(2)}$, and $\hat{S}_{t,k+1}{}^{(1)}$ (assuming that (k−3) is greater than or equal to 0). The subchannel interference cancellation unit 410 obtains the subchannel frequency-domain signal $Y'_{r,k-1}{}^{(3)}$ according to the subchannel frequency-domain reception signal $Y_{r,k-1}$ and the subchannel interference reconstruction signal $S_{ICI,r,k-1}{}^{(3)}$. The subchannel interference reconstruction unit 422 generates the subchannel interference reconstruction signal $S_{ICI,r,k+1}{}^{(3)}$ according to four subchannel frequency-domain estimation signals $\hat{S}_{t,k-1}{}^{(1)}$, $\hat{S}_{t,k}{}^{(2)}$, $\hat{S}_{t,k+2}{}^{(2)}$, and $\hat{S}_{t,k+3}{}^{(1)}$ (assuming that (k+3) is smaller than N). The subchannel interference cancellation unit 412 obtains the subchannel frequency-domain signal $Y'_{r,k+1}{}^{(3)}$ according to the subchannel frequency-domain reception signal $Y_{r,k+1}$ and the subchannel interference reconstruction signal $S_{ICI,r,k+1}{}^{(3)}$.

During the third iteration, the channel estimator 330 needs only to calculate the coefficients $H_{r,t,0}{}^0 \sim H_{r,t,1023}{}^0$, $H_{r,t,0}{}^1 \sim H_{r,t,1023}{}^1$, $H_{r,t,0}{}^2 \sim H_{r,t,1023}{}^2$, $H_{r,t,0}{}^{1022} \sim H_{r,t,1023}{}^{1022}$, and $H_{r,t,0}{}^{1023} \sim H_{r,t,1023}{}^{1023}$ (assuming that N is 1024), namely, to generate the following subchannel interference coefficient matrix:

Subcarrier Index $k$
$$\begin{bmatrix} \overset{d=0}{\underset{Term}{Signal}} & \overset{d=1}{\underset{ICI\ Term}{Left\ 1^{st}}} & \overset{d=2}{\underset{ICI\ Term}{Left\ 2^{nd}}} & & & \overset{d=1022}{\underset{ICI\ Term}{Right\ 2^{nd}}} & \overset{d=1023}{\underset{ICI\ Term}{Right\ 1^{st}}} \\ H_{r,t,0}^0 & H_{r,t,0}^1 & H_{r,t,0}^2 & n.a. & n.a. & H_{r,t,0}^{1022} & H_{r,t,0}^{1023} \\ H_{r,t,1}^0 & H_{r,t,1}^1 & H_{r,t,1}^2 & n.a. & n.a. & H_{r,t,1}^{1022} & H_{r,t,1}^{1023} \\ \vdots & \vdots & \vdots & \cdots & \cdots & \vdots & \vdots \\ \vdots & \vdots & \vdots & \cdots & \cdots & \vdots & \vdots \\ H_{r,t,1022}^0 & H_{r,t,1022}^1 & H_{r,t,1022}^2 & n.a. & n.a. & H_{r,t,1022}^{1022} & H_{r,t,1022}^{1023} \\ H_{r,t,1023}^0 & H_{r,t,1023}^1 & H_{r,t,1023}^2 & n.a. & n.a. & H_{r,t,1023}^{1022} & H_{r,t,1023}^{1023} \end{bmatrix}$$

It can be understood from foregoing example that the PPIC 340 provided by exemplary embodiments of the present disclosure cancels interference from two more adjacent subchannels during each iteration. Besides, the channel estimator 330 only calculates two more columns of coefficients during each iteration than a previous iteration.

The PPIC 340 can work together with any type of MIMO detector 350 to completely filter out subchannel interferences. However, an implementation of the MIMO detector 350 and the iterations performed by the MIMO detector 350 will be described with reference to another exemplary embodiment.

The MIMO detector 350 determines a plurality of bits $b_{t,k,1}, b_{t,k,2}, \ldots$, and $b_{t,k,M}$ of the $k^{th}$ subchannel of the $t^{th}$ transmitting antenna according to a plurality of $k^{th}$ subchannel frequency-domain signals $Y'_{1,k}{}^{(y)}, Y'_{2,k}{}^{(y)}$, and $Y'_{R,k}{}^{(y)}$ of R receiving antennas when the PPIC 340 performs the $y^{th}$ iteration (y is an integer greater than or equal to 1), wherein the bits $b_{t,k,1}, b_{t,k,2}, \ldots$, and $b_{t,k,M}$ of the $k^{th}$ subchannel of the $t^{th}$ transmitting antenna are used for determining the subchannel frequency-domain estimation signal $\hat{S}_{t,k}{}^{(y)}$, and the subchannel frequency-domain estimation signal $\hat{S}_{t,k}{}^{(y)}$ can be determined by the MIMO detector 350 or the channel decoder 360.

In the present exemplary embodiment, the MIMO detector 350 may be a MIMO detector using a message passing algorithm (MPA). The messages to be passed through the MPA are probability messages, wherein the probability messages are passed through each iteration so that the performance of the receiver 300 adopting the MIMO detector 350 can be improved.

Herein a bit vector $\bar{b}$ is defined as a set of bits from the first bit of the $k^{th}$ subchannel of the first transmitting antenna to the last bit of the $k^{th}$ subchannel of the $T^{th}$ transmitting antenna (i.e., $\bar{b} = \{b_0 \sim b_{MT-1}\}$, and for the convenience of description, the subscript k is omitted). When the $k^{th}$ subchannel frequency-domain signal corresponding to the $r^{th}$ receiving antenna output by the PPIC 340 is $Y'_{r,k}{}^{(y)}$, a probability message is generated for the bit $b_n$ according to the subchannel frequency-domain signal $Y'_{r,k}{}^{(y)}$, wherein the bit $b_n$ represents the $n^{th}$ bit in the bit vector $\bar{b}$. Herein the probability message generated for the bit $b_n$ by the subchannel frequency-domain signal $Y'_{r,k}{}^{(y)}$ is defined as $\eta_{(r \to n),k(bn)}$. Namely, the probability message $\eta_{(r \to n),k(bn)}$ represents the probability of that the bit $b_n$ is 0 or 1 when the subchannel frequency-domain reception signal is $Y_{r,k}$. The probability message $\eta_{(r \to n),k}(b_n)$ can be expressed as:

$$\eta_{(r \to n),k}(b_n) = P\left[b_n = b \mid Y'_{r,k}{}^{(y)}\right],$$

$b = 0$ or $1$ $$\propto \sum_{\omega_0^{MT-1\backslash n} \in \Omega, \rho \in A_{r,k}} p(Y'_{r,k}{}^{(y)} \mid \varphi_{r,k} = \rho) \prod_{j=0, j \neq n}^{MT-1} \mu_{(j \to r),k}(b_j)$$

$$= \sum_{\omega_0^{MT-1\backslash n} \in \Omega, \rho \in A_{r,k}} p(Y'_{r,k}{}^{(y)} \mid \varphi_{r,k} = \rho) \text{ (for the 1}^{st}\text{ iteration)}$$

$$\approx \text{MAX}\left[\sum_{\omega_0^{MT-1\backslash n} \in \Omega, \rho \in A_{r,k}} p(Y'_{r,k}{}^{(y)} \mid \varphi_{r,k} = \rho) \cdot \prod_{j=0, j \neq n}^{MT-1} \mu_{(j \to r),k}(b_j)\right]$$

(for Max Product Rule)

wherein $\rho$ belongs to one of the set $A_{r,k}$, $\omega_0^{MT-1\backslash n}$ belongs to one of the set $\Omega$. $\phi_{r,k}$ is an MIMO channel output alphabet of the $k^{th}$ subchannel of the $r^{th}$ receiving antenna (i.e., $\phi_{r,k}=\Sigma_{t=1}^{T}h_{t}S_{t,k}$), $h_t$ is a subchannel impulse response matrix, $A_{r,k}$ represents all the possible sets of MIMO channel output alphabets of the $k^{th}$ subchannel of the $r^{th}$ receiving antenna, $\omega_0^{MT-1\backslash n}$ represents the bit input vectors in the MIMO channel besides $\omega_n$ (i.e., $\omega_0^{MT-1\backslash n}=\{\omega_0, \ldots, \omega_{n-1}, \omega_{n+1}, \ldots, \omega_{MT-1}\}$), and $\Omega$ is the set of all the bit input vectors in the MIMO channel. The probability message $\mu_{(j\to r),k}(b_j)$ represents the probability message generated by the bit $b_j$ for the subchannel frequency-domain reception signal $Y_{r,k}$, and which is equivalent to the probability of that the bit $b_j$ is 1 or 0.

When the MIMO detector 350 performs the first iteration, the MIMO detector 350 uses every probability $p(Y'_{r,k}{}^{(1)=\rho})$ to obtain the probability message $\eta_{(r\to n),k}(b_n)$. It should be noted that every time after the PPIC 340 performs an iteration, the MIMO detector 350 performs several sub iterations to calculate the possible probability of each bit and determine the bits to be output. Thus, the MIMO detector 350 or the channel decoder 360 generates a plurality of subchannel frequency-domain estimation signals according to these bits to be used by the PPIC 340 during each iteration.

During the sub iterations after the first sub iteration, the MIMO detector 350 has to consider the probability message $\mu_{(j\to r),k}(b_j)$ to obtain the probability message $\eta_{(r\to n),t,k}(b)$. In other words, during the sub iterations after the first sub iteration, the MIMO detector 350 has to consider each probability $p(Y'_{r,k}{}^{(y)}|\phi_{r,k}=\rho)$ and each probability message $\mu_{(j\to r),k}(b_j)$ generated during the previous sub iteration to obtain the probability message $\eta_{(r\to n),k}(b_n)$.

The probability message $\mu_{(n\to p),k}(b_n)$ represents a probability message generated by the bit $b_n$ for the subchannel frequency-domain reception signal $Y_{p,k}$ and which is equivalent to the probability of that the bit $b_n$ is 1 or 0. The probability message $\mu_{(n\to p),k}(b_n)$ is expressed as:

$$\mu_{(n\to p),k}(b_n) = P(b_n = b)$$

$$= \frac{P_a[b_n = b]\cdot \prod_{r=0, r\neq p}^{R-1} P[b_n = b | Y'^{(y)}_{r,k}]}{P_a[b_n = 0]\cdot \prod_{r=0, r\neq p}^{R-1} P[b_n = 0 | Y'^{(y)}_{r,k}] + P_a[b_n = 1]\cdot \prod_{r=0, r\neq p}^{R-1} P[b_n = 1 | Y'^{(y)}_{r,k}]}$$

$$= \frac{\eta_n(b)\cdot \prod_{r=0, r\neq p}^{R-1} \eta_{(r\to n),k}(b)}{\eta_n(0)\cdot \prod_{r=0, r\neq p}^{R-1} \eta_{(r\to n),k}(0) + \eta_n(1)\cdot \prod_{r=0, r\neq p}^{R-1} \eta_{(r\to n),k}(1)}$$

wherein $\eta_n(b)$ is an a-priori probability of the bit $b_n$, and which is equal to $P_a[b_n=b]$. During the first sub iteration, the a-priori probability $\eta_n(b)$ is initialized to 0.5. During the sub iterations of the $w^{th}$ iteration (w is an integer greater than 1), the a-priori probability $\eta_n(b)$ is a result obtained by the channel decoder 360, and the a-priori probability $\eta_n(b)$ is set to 0.5 if the channel decoder 360 does not offer any result.

Figure 5:
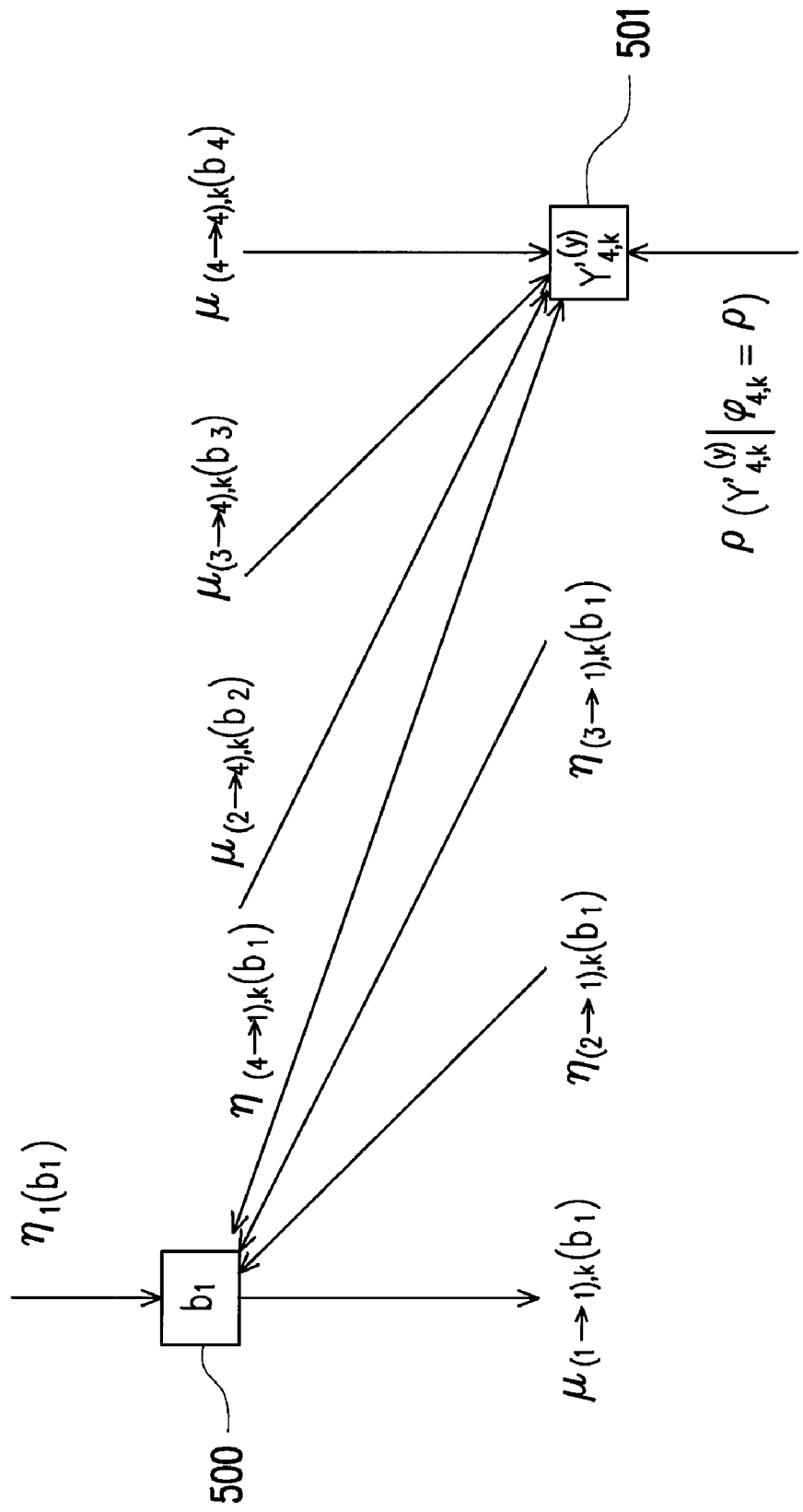
FIG. 5 is a diagram of a message passing algorithm (MPA) according to an exemplary embodiment of the present disclosure.

FIG. 5 is a diagram of a MPA according to an exemplary embodiment of the present disclosure, wherein a MIMO communication system with four receiving antennas is described as an example. Referring to FIG. 5, the function node 501 represents a function of receiving the probability $p(Y'_{4,k}{}^{(y)}|\phi_{4,k}=\rho)$ calculated according to the subchannel frequency-domain reception signal $Y'_{r,k}{}^{(y)}$ and the probability message $\eta_{(4\to 1),k}(b_1)$ calculated according to the probability messages $\mu_{(2\to 4),k}(b_2)$, $\mu_{(3\to 4),k}(b_3)$, and $\mu_{(4\to 4),k}(b_4)$ and transmitting the probability message $\eta_{(4\to 1),k}(b_1)$ to the bit node 500. Then, the bit node 500 calculates the probability message $\mu_{(1\to 1),k}(b_1)$ according to the a-priori probability $\eta_1(b_1)$ and the probability messages $\eta_{(2\to 1),k}(b_1)$, $\eta_{(3\to 1),k}(b_1)$, and $\eta_{(4\to 1),k}(b_1)$ and transmits the probability message $\mu_{(1\to 1),k}(b_1)$ to the function node (not shown) for receiving the subchannel frequency-domain reception signal $Y_{1,k}$.

In short, the MIMO detector 350 first calculates a probability message $\eta_{(r\to n),k}(b_n)$ during each sub iteration and then calculates a probability message $\mu_{(n\ominus p),k}(b_n)$. During the next sub iteration, the MIMO detector 350 calculates the probability message $\eta_{(r\to n),k}(b_n)$ according to the probability message $\mu_{(n\ominus p),k}(b_n)$ calculated during the previous sub iteration and calculates the probability message $\mu_{(n\ominus p),k}(b_n)$ according to the probability message $\eta_{(r\to n),k}(b_n)$. After performing certain number of sub iterations, the MIMO detector 350 calculates the final probability $\mu_{n,k}(b_n)$ of that the bit $b_n$ is 1 or 0. The final probability $\mu_{n,k}(b_n)$ can be expressed as:

$$\mu_{n,k}(b) = P(b_n = b) = \frac{\eta_n(b)\cdot \prod_{r=0}^{R-1} \eta_{(r\to n),k}(b)}{\eta_n(0)\cdot \prod_{r=0}^{R-1} \eta_{(r\to n),k}(0) + \eta_n(1)\cdot \prod_{r=0}^{R-1} \eta_{(r\to n),k}(1)}$$

After calculating the final probability $\mu_{n,k}(b_n)$ of the bit $b_n$, the MIMO detector 350 makes a hard decision or a soft decision to the bit $b_n$ according to the final probability $\mu_{n,k}(b_n)$ of the bit $b_n$ to determine whether the bit $b_n$ is 0 or 1.

If enough number of iterations has been performed or the bit error rate (BER) has met the requirement, the PPIC 340 does not perform any iteration. In this case, the MIMO detector 350 makes a hard decision to the bit $b_n$ according to the final probability $\mu_{n,k}(b_n)$ of the bit $b_n$. Contrarily, if the PPIC 340 continues to perform iterations, the MIMO detector 350 makes a soft decision to the bit $b_n$ according to the final probability $\mu_{n,k}(b_n)$ of the bit $b_n$.

When the MIMO detector 350 makes the soft decision to the bit $b_n$ according to the final probability $\mu_{n,k}(b_n)$ of the bit $b_n$, the bit $b_n$ is determined through following expression:

$$\hat{b}_n = \tanh\left\{0.5\cdot \ln\left[\frac{\mu_{n,k}(1)}{\mu_{n,k}(0)}\right]\right\}$$

wherein $\hat{b}_n$ represents the output value of the bit $b_n$. When the MIMO detector 350 makes the hard decision to the bit $b_n$ according to the final probability $\mu_{n,k}(b_n)$ of the bit $b_n$, the bit $b_n$ is determined through following expression:

$$\tilde{b}_n = \begin{cases} 1, & \mu_{n,k}(1) \geq \mu_{n,k}(0) \\ 0, & \mu_{n,k}(1) < \mu_{n,k}(0) \end{cases}$$

wherein $\tilde{b}_n$ represents the output value of the bit $b_n$.

The MIMO detector 350 generates a plurality of subchannel frequency-domain estimation signals according to a plurality of bits generated when it makes the soft decision, wherein these subchannel frequency-domain estimation signals allow the PPIC 340 to reconstruct the subchannel interference signals. If the modulation order is 2, a quadrature phase shift keying (QPSK) modulation technique can be adopted. Herein the subchannel frequency-domain estimation signal $\hat{S}_{t,k}^{(i)}$ generated by the MIMO detector 350 can be expressed as:

$$\hat{S}_{t,k}^{(i)} = \frac{1}{\sqrt{2}} \cdot \hat{b}_{M(t-1)} + j \frac{1}{\sqrt{2}} \cdot \hat{b}_{M(t-1)+1}$$

If the modulation order is 4, a 16 quadrature amplitude modulation (16-QAM) can be adopted. Herein the subchannel frequency-domain estimation signal $\hat{S}_{t,k}^{(i)}$ generated by the MIMO detector 350 can be expressed as:

$$\hat{S}_{t,k}^{(i)} = -\frac{1}{\sqrt{10}} \cdot \hat{b}_{M(t-1)} \cdot (2 + \hat{b}_{M(t-1)+2}) - j \frac{1}{\sqrt{10}} \cdot \hat{b}_{M(t-1)+1} \cdot (2 + \hat{b}_{M(t-1)+3})$$

In addition, it should be noted that the MIMO detector 350 working along with the PPIC 340 may not be a MIMO detector using MPA. Instead, the PPIC 340 may also work along with different types of MIMO detectors. Similarly, the MIMO detector 350 using the MPA may also work along with a different type of PPIC.

Figure 6:
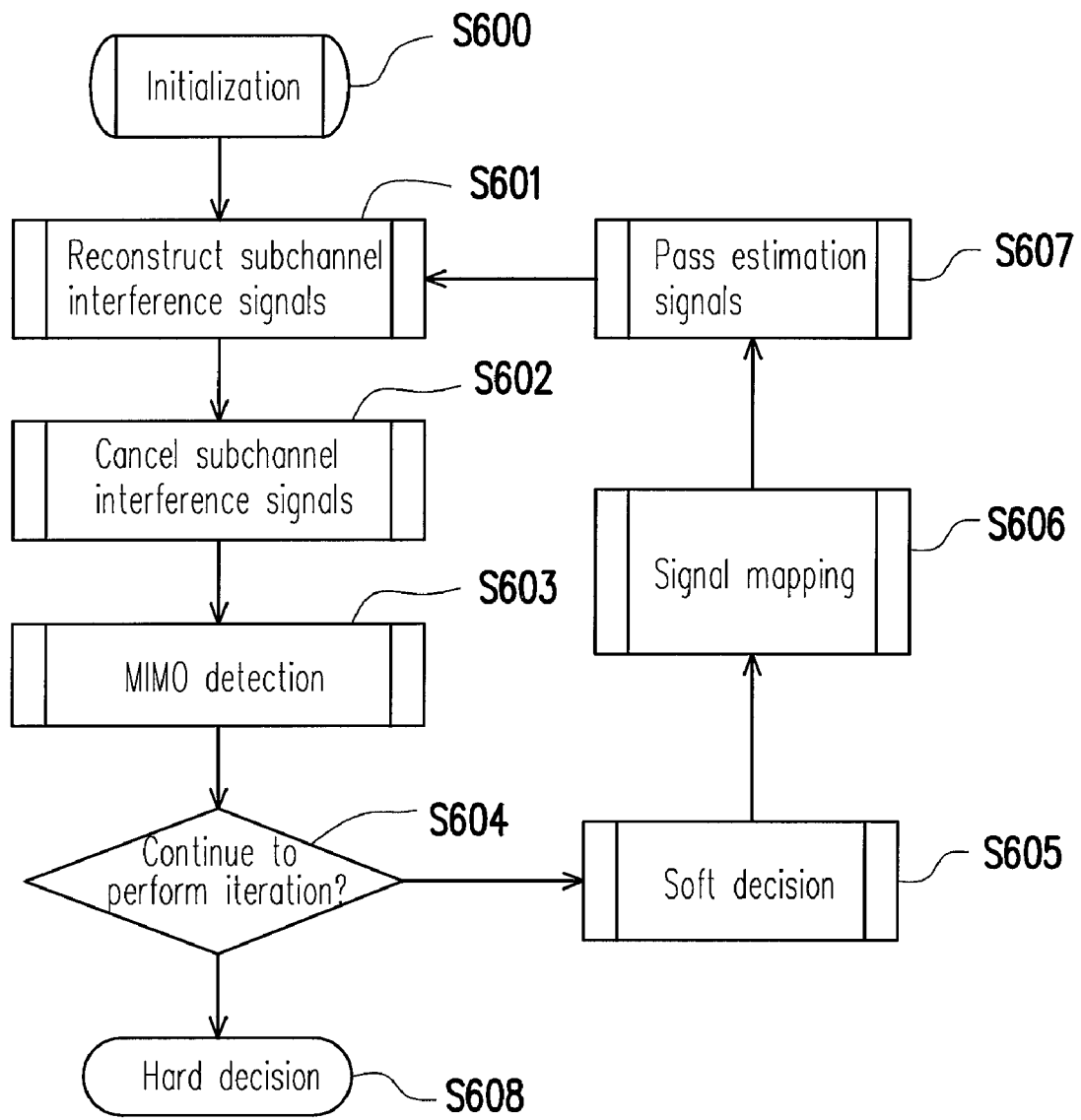
FIG. 6 is a flowchart of a progressive parallel interference cancellation method according to an exemplary embodiment of the present disclosure.

Below, a progressive parallel interference cancellation method provided by the present disclosure will be described with reference to an exemplary embodiment of the present disclosure. FIG. 6 is a flowchart of a progressive parallel interference cancellation method according to an exemplary embodiment of the present disclosure. The steps in FIG. 6 can be accomplished by the PPIC 340 and the MIMO detector 350 illustrated in FIG. 2.

First, in step S600, a subchannel frequency-domain estimation signal $\hat{S}_{t,k}^{(0)}$ is initialized to 0. Then, in step S601, a subchannel interference signal $S_{ICI,r,k}^{(0)}$ or $S_{ICI,r,k}^{(i)}$ is reconstructed, wherein during the first iteration, the subchannel interference signal $S_{ICI,r,k}^{(0)}$ is preset to 0, and during the $i^{th}$ iteration, a subchannel interference reconstruction signal $S_{ICI,r,k}^{(i)}$ is generated according to (2×i−2) subchannel frequency-domain estimation signals $\hat{S}_{t,((k-i+1))_N}^{(1)}$, $\hat{S}_{t,((k-i+2))_N}^{(2)}, \ldots, \hat{S}_{t,((k-2))_N}^{(i-2)}, \hat{S}_{t,((k-1))_N}^{(i-1)}, \hat{S}_{t,((k+1))_N}^{(i-1)}, \hat{S}_{t,((k+2))_N}^{(i-2)}, \ldots, \hat{S}_{t,((k+i-2))_N}^{(2)}, \hat{S}_{t,((k+i-1))_N}^{(1)}$, wherein the method of generating the subchannel interference reconstruction signal $S_{ICI,r,k}^{(i)}$ according to the (2×i−2) subchannel frequency-domain estimation signals $\hat{S}_{t,((k-i+1))_N}^{(1)}, \hat{S}_{t,((k-i+2))_N}^{(2)}, \ldots, \hat{S}_{t,((k-2))_N}^{(i-2)}, \hat{S}_{t,((k-1))_N}^{(i-1)}, \hat{S}_{t,((k+1))_N}^{(i-1)}, \hat{S}_{t,((k+2))_N}^{(i-2)}, \ldots, \hat{S}_{t,((k+i-2))_N}^{(2)}, \hat{S}_{t,((k+i-1))_N}^{(1)}$ can be referred to foregoing description and will not be described herein.

Next, in step S602, the subchannel interference signal component in the received subchannel frequency-domain reception signal $Y_{r,k}$ is cancelled, so as to generate the subchannel frequency-domain signal and perform a MIMO detection. During the first iteration, the subchannel frequency-domain signal $Y'_{r,k}^{(1)}$ is equal to the subchannel frequency-domain reception signal $Y_{r,k}$, and during the $i^{th}$ iteration, the subchannel frequency-domain signal $Y'_{r,k}^{(i)}$ is equal to the subchannel frequency-domain reception signal $Y_{r,k}$ minus the subchannel interference reconstruction signal $S_{ICI,r,k}^{(i)}$.

Thereafter, in step S603, the MIMO detection is performed according to a plurality of subchannel frequency-domain signals, so as to calculate the probability of each bit. For example, during the $y^{th}$ iteration, the MIMO detection is performed to the subchannel frequency-domain signals $Y'_{1,k}^{(y)}, Y'_{2,k}^{(y)}, \ldots,$ and $Y'_{R,k}^{(y)}$ to calculate the probabilities of the first bit in the $k^{th}$ subchannel of the first transmitting antenna to the last bit in the $k^{th}$ subchannel of the $R^{th}$ transmitting antenna. The probability of each bit may be calculated through aforementioned MPA or other methods.

Next, in step S604, whether the iteration is still to be performed is determined. If no more iteration is to be performed, step S608 is executed; otherwise, step S605 is executed. Whether to perform more iterations may be determined by determining whether the number of iterations satisfies a predetermined iteration number or whether a SNR or BER calculated by a backend circuit satisfies the requirement of the entire communication system.

If the iteration is still to be performed, in step S605, a soft decision is made according to the probability of each bit so as to determine an output value of each bit. The method for determining the output value of each bit has been described above therefore will not be described herein. Thereafter, in step S606, the bits generated through the soft decision are mapped to generate a plurality of subchannel frequency-domain estimation signals, wherein how to map the bits to generate the subchannel frequency-domain estimation signals has been described above therefore will not be described herein.

Next, in step S607, the subchannel frequency-domain estimation signals generated during previous iterations are passed so that in step S601, the subchannel interference reconstruction signal $S_{ICI,r,k}^{(i)}$ can be generated simply according to (2×i−2) subchannel frequency-domain estimation signals $\hat{S}_{t,((k+i-1))_N}^{(1)}, \hat{S}_{t,((k-i+2))_N}^{(2)}, \ldots, \hat{S}_{t,((k-2))_N}^{(i-2)}, \hat{S}_{t,((k-1))_N}^{(i-1)}, \hat{S}_{t,((k+1))_N}^{(i-1)}, \hat{S}_{t,((k+2))_N}^{(i-2)}, \ldots, \hat{S}_{t,((k+i-2))_N}^{(2)}, \hat{S}_{t,((k+i-1))_N}^{(1)}$ during the $i^{th}$ iteration. The method for passing the subchannel frequency-domain estimation signals generated during previous iterations have been described above therefore will not be described herein.

The subchannel interference signal component is greatly reduced after several iterations are performed. Then, when the iteration is not to be performed anymore, in step S608, a hard decision is performed according to the final probability of each bit generated in the step S603, so as to generate the output value of each bit.

As described above, the present disclosure provides a PPIC and a method and a receiver thereof, wherein each subchannel interference reconstruction signal is reconstructed through iterations, and a corresponding subchannel interference reconstruction signal is subtracted from each subchannel frequency-domain reception signal to obtain a subchannel frequency-domain signal. According to the present disclosure, subchannel interferences can be cancelled without re-performing channel coding or estimating the SNR or frequency offset. In addition, the technique provided by the present disclosure has reduced calculation complexity therefore is adaptable to very large scale integrated circuits (VLSI).

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A progressive parallel interference canceller (PPIC), adaptable to a receiver in a multiple input multiple output (MIMO) communication system based on an orthogonal frequency-division multiplexing (OFDM) modulation technique, wherein the receiver performs a plurality of iterations, the PPIC comprising:

a plurality of subchannel interference reconstruction units, wherein the $k^{th}$ subchannel interference reconstruction unit corresponding to a $r^{th}$ receiving antenna generates a $k^{th}$ subchannel interference reconstruction signal $S_{ICI,r,k}^{(i)}$ corresponding to the $r^{th}$ receiving antenna during the $i^{th}$ iteration according to (2×i−2) subchannel frequency-domain estimation signals $\hat{S}_{t,((k-i+1))_N}^{(1)}$, $\hat{S}_{t,((k-i+2))_N}^{(2)}$, ..., $\hat{S}_{t,((k-2))_N}^{(i-2)}$, $\hat{S}_{t,((k-1))_N}^{(i-1)}$, $\hat{S}_{t,((k+1))_N}^{(i-1)}$, $\hat{S}_{t,((k+2))_N}^{(i-2)}$, ..., $\hat{S}_{t,((k+i-2))_N}^{(2)}$, $\hat{S}_{t,((k+i-1))_N}^{(1)}$, wherein i is an integer greater than 1, the subchannel frequency-domain estimation signal $\hat{S}_{t,q}^{(x)}$ represents a $q^{th}$ subchannel frequency-domain estimation signal corresponding to a $t^{th}$ transmitting antenna generated during the $x^{th}$ iteration, and $((\bullet))_N$ represents a calculation of dividing by N to obtain a remainder, N is a number of subchannels in the MIMO communication system, k is an integer between 0 and (N−1), x is an integer between 1 and (i−1), and q=k−i+x or q=k+i−x; and a plurality of subchannel interference cancellation units, wherein the $k^{th}$ subchannel interference cancellation unit corresponding to the $r^{th}$ receiving antenna is coupled to the $k^{th}$ subchannel interference reconstruction unit corresponding to the $r^{th}$ receiving antenna, and the $k^{th}$ subchannel interference cancellation unit obtains a $k^{th}$ subchannel frequency-domain signal $Y'_{r,k}^{(i)}$ corresponding to the $r^{th}$ receiving antenna according to a $k^{th}$ subchannel frequency-domain reception signal $Y_{r,k}$ and the $k^{th}$ subchannel interference reconstruction signal $S_{ICI,r,k}^{(i)}$ corresponding to the $r^{th}$ receiving antenna during the $i^{th}$ iteration.

2. The PPIC according to claim 1, wherein during the $1^{st}$ iteration, the $k^{th}$ subchannel interference reconstruction unit corresponding to the $r^{th}$ receiving antenna presets a $k^{th}$ subchannel interference reconstruction signal $S_{ICI,r,k}^{(1)}$ corresponding to the $r^{th}$ receiving antenna to 0, and the $k^{th}$ subchannel interference cancellation unit corresponding to the $r^{th}$ receiving antenna obtains a $k^{th}$ subchannel frequency-domain signal $Y'_{r,k}^{(1)}$ corresponding to the $r^{th}$ r,k receiving antenna according to the $k^{th}$ subchannel frequency-domain reception signal $Y_{r,k}$ corresponding to the $r^{th}$ receiving antenna.

3. The PPIC according to claim 2 further comprising:

a MIMO detector, coupled to the subchannel interference reconstruction units and the subchannel interference cancellation units, for determining a plurality of bits $b_0$, $b_1$, ..., and $b_{MT-1}$ corresponding to $k^{th}$ subchannels of the transmitting antennas according to the $k^{th}$ subchannel frequency-domain signals $Y'_{1,k}^{(i)}, Y'_{2,k}^{(i)}, \ldots$, and $Y'_{R,k}^{(i)}$ of the receiving antennas when the PPIC performs the $i^{th}$ iteration, wherein M is a bit modulation order, R is a number of the receiving antennas, T is a number of the transmitting antennas, and the bits $b_{M(t-1)}$, $b_{M(t-1)+1}$, ..., and $b_{Mt-1}$ corresponding to the $k^{th}$ subchannel of the $t^{th}$ transmitting antenna are used for determining the subchannel frequency-domain estimation signal $\hat{S}_{t,k}^{(i)}$.

4. The PPIC according to claim 3, wherein the MIMO detector is a MIMO detector using a message passing algorithm (MPA).

5. The PPIC according to claim 3, wherein the MIMO detector performs a plurality of sub iterations during the $i^{th}$ iteration, and during each of the sub iterations, the MIMO detector generates a probability message for the bit $b_n$ according to the subchannel frequency-domain signal $Y'_{r,k}^{(i)}$ and generates a probability message for the subchannel frequency-domain signal $Y'_{p,k}^{(i)}$ according to the bit $b_a$, and during the last sub iteration, the MIMO detector generates probabilities of the bits $b_0, b_1, \ldots,$ and $b_{MT-1}$ according to the probability messages, wherein p is an integer between 1 and T, and a and n are integers between 0 and (MT−1).

6. The PPIC according to claim 5, wherein if the $i^{th}$ iteration is the last iteration, the MIMO detector makes a hard decision according to the probabilities of the bits $b_0, b_1, \ldots,$ and $b_{MT-1}$ to determine the bits $b_0, b_1, \ldots,$ and $b_{MT-1}$, and if the $i^{th}$ iteration is not the last iteration, the MIMO detector makes a soft decision according to the probabilities of the bits $b_0, b_1, \ldots,$ and $b_{MT-1}$ to determine the bits $b_0, b_1, \ldots,$ and $b_{MT-1}$.

7. The PPIC according to claim 3 further comprising a channel decoder coupled to the MIMO detector, wherein the channel decoder determines the subchannel frequency-domain estimation signal $\hat{S}_{t,k}^{(i)}$ according to the bits $b_{M(t-1)}$, $b_{M(t-1)+1}$, ..., and $b_{Mt-1}$ of the $k^{th}$ subchannel of the $t^{th}$ transmitting antenna.

8. The PPIC according to claim 3, wherein the MIMO detector determines the subchannel frequency-domain estimation signal $\hat{S}_{t,k}^{(i)}$ according to the bits $b_{M(t-1)}$, $b_{M(t-1)+1}$, ..., and $b_{Mt-1}$ of the $k^{th}$ subchannel of the $t^{th}$ transmitting antenna.

9. The PPIC according to claim 1, wherein a $k^{th}$ subchannel frequency-domain signal $Y'_{r,k}^{(i)}$ corresponding to the $r^{th}$ receiving antenna is equivalent to a $k^{th}$ subchannel frequency-domain reception signal $Y_{r,k}$ corresponding to the $r^{th}$ receiving antenna minus the $k^{th}$ subchannel interference reconstruction signal $S_{ICI,r,k}^{(i)}$.

10. The PPIC according to claim 1, wherein the $k^{th}$ subchannel interference reconstruction unit corresponding to the $r^{th}$ receiving antenna has a memory, and the $k^{th}$ subchannel interference reconstruction unit of the $r^{th}$ receiving antenna stores the subchannel frequency-domain estimation signals $\hat{S}_{t,((k+i-1))_N}^{(1)}$, $\hat{S}_{t,((k-i+2))_N}^{(2)}$, ..., $\hat{S}_{t,((k-2))_N}^{(i-2)}$, $\hat{S}_{t,((k-1))_N}^{(i-1)}$, $\hat{S}_{t,((k+1))_N}^{(i-1)}$, $\hat{S}_{t,((k+2))_N}^{(i-2)}$, ..., $\hat{S}_{t,((k+i-2))_N}^{(2)}$, $\hat{S}_{t,((k+i-1))_N}^{(1)}$ into the memory, transmits the subchannel frequency-domain estimation signals $\hat{S}_{t,((k-i+2))_N}^{(1)}$, $\hat{S}_{t,((k-i+3))_N}^{(2)}$, ..., $\hat{S}_{t,((k-1))_N}^{(i-2)}$, $\hat{S}_{t,((k))_N}^{(i-1)}$ to the $(k+1)^{th}$ subchannel interference reconstruction unit corresponding to the $r^{th}$ receiving antenna, and transmits the subchannel frequency-domain estimation signals $\hat{S}_{t,((k+i-2))_N}^{(1)}$, $\hat{S}_{t,((k+i-3))_N}^{(2)}$, ..., $\hat{S}_{t,((k+1))_N}^{(i-2)}$, $\hat{S}_{t,((k))_N}^{(i-1)}$ to the $(k-1)^{th}$ subchannel interference reconstruction unit corresponding to the $r^{th}$ receiving antenna.

11. The PPIC according to claim 1 further comprising a channel estimator, wherein the channel estimator estimates a plurality of channel impulse responses of a wireless channel and calculates a plurality of coefficients according to the channel impulse responses, wherein the $k^{th}$ subchannel interference reconstruction unit corresponding to the $r^{th}$ receiving antenna generates a $k^{th}$ subchannel interference reconstruction signal $S_{ICI,r,k}^{(i)}$ corresponding to the $r^{th}$ receiving antenna according to the (2×i−2) subchannel frequency-domain estimation signals $\hat{S}_{t,((k-i+1))_N}^{(1)}$, $\hat{S}_{t,((k-i+2))_N}^{(2)}$, ..., $\hat{S}_{t,((k-2))_N}^{(i-2)}$, $\hat{S}_{t,((k+2))_N}^{(i-2)}$, $\hat{S}_{t,((k-1))_N}^{(i-1)}$, $\hat{S}_{t,((k+1))_N}^{(i-1)}$, ..., $\hat{S}_{t,((k+i-2))_N}^{(2)}$, $\hat{S}_{t,((k+i-1))_N}^{(1)}$ and the coefficients during the $i^{th}$ iteration.

12. A receiver, adaptable to a MIMO communication system based on an OFDM modulation technique, wherein the receiver performs a plurality of iterations and comprises:

a plurality of receiving antennas;

a plurality of OFDM demodulators, wherein each of the OFDM demodulators is coupled to one of the receiving antennas;

a PPIC, coupled to the OFDM demodulators, the PPIC comprising:

a plurality of subchannel interference reconstruction units, wherein the $k^{th}$ subchannel interference reconstruction unit corresponding to the $r^{th}$ receiving antenna generates a $k^{th}$ subchannel interference reconstruction signal $S_{ICI,r,k}^{(i)}$ corresponding to the $r^{th}$ receiving antenna according to $(2 \times i-2)$ subchannel frequency-domain estimation signals $\hat{S}_{t,((k-i+1))_N}^{(1)}$, $\hat{S}_{t,((k-i+2))_N}^{(2)}$, ..., $\hat{S}_{t,((k-2))_N}^{(i-2)}$, $\hat{S}_{t,((k+1))_N}^{(i-1)}$, $\hat{S}_{t,((k+2))_N}^{(i-2)}$, $\hat{S}_{t,((k-1))_N}^{(i-1)}$, ..., $\hat{S}_{t,((k+i-2))_N}^{(2)}$, $\hat{S}_{t,((k+i-1))_N}^{(1)}$ during the $i^{th}$ iteration, wherein i is an integer greater than 1, the subchannel frequency-domain estimation signal represents the $q^{th}$ subchannel frequency-domain estimation signal corresponding to a $t^{th}$ transmitting antenna generated during the $x^{th}$ iteration, $((\cdot))_N$ represents a calculation of dividing by N to obtain a remainder, N is a number of subchannels in the MIMO communication system, k is an integer between 0 and $(N-1)$, x is an integer between 1 and $(i-1)$, and $q=k-i+x$ or $q=k+i-x$; and a plurality of subchannel interference cancellation units, wherein the $k^{th}$ subchannel interference cancellation unit corresponding to the $r^{th}$ receiving antenna is coupled to the $k^{th}$ subchannel interference reconstruction unit corresponding to the $r^{th}$ receiving antenna, and the $k^{th}$ subchannel interference cancellation unit obtains a $k^{th}$ subchannel frequency-domain signal $Y_{r,k}^{(i)}$ corresponding to the $r^{th}$ receiving antenna according to a $k^{th}$ subchannel frequency-domain reception signal $Y_{r,k}$ and the $k^{th}$ subchannel interference reconstruction signal $S_{ICI,r,k}^{(i)}$ corresponding to the $r^{th}$ receiving antenna during the $i^{th}$ iteration; and a MIMO detector, coupled to the subchannel interference reconstruction units and the subchannel interference cancellation units, for determining a plurality of bits $b_0$, $b_1$, ..., and $b_{MT-1}$ corresponding to $k^{th}$ subchannels of the transmitting antennas according to the $k^{th}$ subchannel frequency-domain signals $Y'_{1,k}^{(i)}$, $Y'_{2,k}^{(i)}$, ..., and $Y'_{R,k}^{(i)}$ of the receiving antennas when the PPIC performs the $i^{th}$ iteration, wherein M is a bit modulation order, R is a number of the receiving antennas, T is a number of the transmitting antennas, and the bits $b_{M(t-1)}$, $b_{M(t-1)+1}$, ..., and $b_{Mt-1}$ corresponding to the $k^{th}$ subchannel of the $t^{th}$ transmitting antenna are used for determining the subchannel frequency-domain estimation signal $\hat{S}_{t,k}^{(i)}$.

13. The receiver according to claim 12, wherein when the PPIC performs the $1^{st}$ iteration, the $k^{th}$ subchannel interference reconstruction unit corresponding to the $r^{th}$ receiving antenna presets a $k^{th}$ subchannel interference reconstruction signal $S_{ICI,r,k}^{(1)}$ corresponding to the $r^{th}$ receiving antenna to 0, and the $k^{th}$ subchannel interference cancellation unit corresponding to the $r^{th}$ receiving antenna obtains a $k^{th}$ subchannel frequency-domain signal $Y'_{r,k}^{(1)}$ corresponding to the $r^{th}$ receiving antenna according to the $k^{th}$ subchannel frequency-domain reception signal $Y_{r,k}$ corresponding to the $r^{th}$ receiving antenna.

14. The receiver according to claim 12, wherein a $k^{th}$ subchannel frequency-domain signal $Y'_{r,k}^{(i)}$ corresponding to the $r^{th}$ receiving antenna is equivalent to a $k^{th}$ subchannel frequency-domain reception signal $Y_{r,k}$ corresponding to the $r^{th}$ receiving antenna minus the $k^{th}$ subchannel interference reconstruction signal $S_{ICI,r,k}^{(i)}$.

15. The receiver according to claim 12, wherein the $k^{th}$ subchannel interference reconstruction unit corresponding to the $r^{th}$ receiving antenna has a memory, and the $k^{th}$ subchannel interference reconstruction unit corresponding to the $r^{th}$ receiving antenna stores the subchannel frequency-domain estimation signals $\hat{S}_{t,((k-i+1))_N}^{(1)}$, $\hat{S}_{t,((k-i+2))_N}^{(2)}$, ..., $\hat{S}_{t,((k-2))_N}^{(i-1)}$, $\hat{S}_{t,((k-1))_N}^{(i-1)}$, $\hat{S}_{t,((k))_N}^{(i-1)}$, $\hat{S}_{t,((k+1))_N}^{(i-1)}$, ..., $\hat{S}_{t,((k+2))_N}^{(i-2)}$, ..., $\hat{S}_{t,((k+i-2))_N}^{(2)}$, $\hat{S}_{t,((k+i-1))_N}^{(1)}$ into the memory, transmits the subchannel frequency-domain estimation signals $\hat{S}_{t((k-i+2))_N}^{(1)}$, $\hat{S}_{t((k-i+3))_N}^{(2)}$, ..., $\hat{S}_{t,((k-1))_N}^{(i-2)}$, $\hat{S}((k))_N^{(i-1)}$ to the $(k+1)^{th}$ subchannel interference reconstruction unit corresponding to the $r^{th}$ receiving antenna, and transmits the subchannel frequency-domain estimation signals $\hat{S}_{t((k+i-2))_N}^{(1)}$, $\hat{S}_{t((k+i-3))_N}^{(2)}$, ..., $\hat{S}_{t,((k+1))_N}^{(i-2)}$, $\hat{S}((k))_N^{(i-1)}$ to the $(k-1)^{th}$ subchannel interference reconstruction unit corresponding to the $r^{th}$ receiving antenna.

16. The receiver according to claim 12 further comprising a channel estimator, wherein the channel estimator estimates a plurality of channel impulse responses of a wireless channel and calculates a plurality of coefficients according to the channel impulse responses, wherein the $k^{th}$ subchannel interference reconstruction unit corresponding to the $r^{th}$ receiving antenna generates a $k^{th}$ subchannel interference reconstruction signal $S_{ICI,r,k}^{(i)}$ corresponding to the $r^{th}$ receiving antenna according to $(2 \times i-2)$ subchannel frequency-domain estimation signals $\hat{S}_{t,((k-i+1))_N}^{(1)}$, $\hat{S}_{t,((k-i+2))_N}^{(2)}$, ..., $\hat{S}_{t,((k-2))_N}^{(i-2)}$, $\hat{S}_{t,((k-1))_N}^{(i-1)}$, $\hat{S}_{t,((k+1))_N}^{(i-1)}$, $\hat{S}_{t,((k+2))_N}^{(i-2)}$, ..., $\hat{S}_{t,((k+i-2))_N}^{(2)}$, $\hat{S}_{t,((k+i-1))_N}^{(1)}$, and the coefficients during the $i^{th}$ iteration.

17. The receiver according to claim 12, wherein the MIMO detector is a MIMO detector using a MPA.

18. The receiver according to claim 12, wherein the MIMO detector performs a plurality of sub iterations during the $i^{th}$ iteration, and during each of the sub iterations, the MIMO detector generates a probability message for the bit $b_n$ according to the subchannel frequency-domain signal $Y'_{r,k}^{(i)}$ and then generates a probability message for the subchannel frequency-domain signal $Y'_{p,k}^{(i)}$ according to the bit $b_a$, and during the last sub iteration, the MIMO detector generates probabilities of the bits $b_0$, $b_1$, ..., and $b_{MT-1}$ according to the probability messages, wherein p is an integer between 1 and T, and a and n are integers between 0 and $(MT-1)$.

19. The receiver according to claim 18, wherein if the $i^{th}$ iteration is the last iteration, the MIMO detector makes a hard decision according to the probabilities of the bits $b_0$, $b_1$, ..., and $b_{MT-1}$ to determine the bits $b_0$, $b_1$, ..., and $b_{MT-1}$, and if the $i^{th}$ iteration is not the last iteration, the MIMO detector makes a soft decision according to the probabilities of the bits $b_0$, $b_1$, ..., and $b_{MT-1}$ to determine the bits $b_0$, $b_1$, ..., and $b_{MT-1}$.

20. The receiver according to claim 12 further comprising a channel decoder coupled to the MIMO detector, wherein the channel decoder determines the subchannel frequency-domain estimation signal $\hat{S}_{t,k}^{(i)}$ according to the bits $b_{M(t-1)}$, $b_{M(t-1)+1}$, ..., and $b_{Mt-1}$ of the $k^{th}$ subchannel of the $t^{th}$ transmitting antenna.

21. The receiver according to claim 12, wherein the MIMO detector determines the subchannel frequency-domain estimation signal $\hat{S}_{t,k}^{(i)}$ according to the bits $b_{M(t-1)}$, $b_{M(t-1)+1}$, ..., and $b_{Mt-1}$ of the $k^{th}$ subchannel of the $t^{th}$ transmitting antenna.

22. A progressive parallel interference cancellation method, adaptable to a receiver in a MIMO communication system based on an OFDM modulation technique, wherein the receiver performs a plurality of iterations, the progressive parallel interference cancellation method comprising:

generating a $k^{th}$ subchannel interference reconstruction signal $S_{ICI,r,k}^{(i)}$ corresponding to the $r^{th}$ receiving antenna according to $(2 \times i-1)$ subchannel frequency-domain estimation signals $\hat{S}_{t,((k-i+1))_N}^{(1)}$, $\hat{S}_{t,((k-i+2))_N}^{(2)}$, ..., $\hat{S}_{t,((k-2))_N}^{(i-2)}$, $\hat{S}_{t,((k-1))_N}^{(i-1)}$, $\hat{S}_{t,((k+2))_N}^{(i-2)}$, $\hat{S}_{t,((k+1))_N}^{(i-1)}$, ..., $\hat{S}_{t,((k+i-2))_N}^{(2)}$, $\hat{S}_{t,((k+i-1))_N}^{(1)}$, during the $i^{th}$ iteration, wherein i is an integer greater than 1, the subchannel frequency-domain estimation signal $\hat{S}_{1,q}^{(x)}$ represents the $q^{th}$ subchannel frequency-domain estimation signal corresponding to a $t^{th}$ transmitting antenna generated during the $x^{th}$ iteration, $((\cdot))_N$ represents a calculation of dividing by N to obtain a remainder, N is a number of subchannels in the MIMO communication system, k is an integer between 0 and (N−1), x is an integer between 1 and (i−1), q=k−i+x or q=k+i−x; and obtaining a $k^{th}$ sub channel frequency-domain signal $Y'_{r,k}^{(i)}$ corresponding to the $r^{th}$ receiving antenna according to a $k^{th}$ subchannel frequency-domain reception signal $Y_{r,k}$ and the $k^{th}$ subchannel interference reconstruction signal $S_{ICI,r,k}^{(i)}$ corresponding to the $r^{th}$ receiving antenna during the $i^{th}$ iteration.

23. The progressive parallel interference cancellation method according to claim 22 further comprising:

during the first iteration, presetting a $k^{th}$ subchannel interference reconstruction signal $S_{ICI,r,k}^{(1)}$ corresponding to the $r^{th}$ receiving antenna to 0, and obtaining a $k^{th}$ subchannel frequency-domain signal $Y'_{r,k}^{(1)}$ corresponding to the $r^{th}$ receiving antenna according to the $k^{th}$ subchannel frequency-domain reception signal $Y_{r,k}$ corresponding to the $r^{th}$ receiving antenna.

24. The progressive parallel interference cancellation method according to claim 22, wherein a $k^{th}$ subchannel frequency-domain signal $Y'_{r,k}^{(i)}$ corresponding to the $r^{th}$ receiving antenna is equivalent to a $k^{th}$ subchannel frequency-domain reception signal $Y_{r,k}$ corresponding to the $r^{th}$ receiving antenna minus the $k^{th}$ subchannel interference reconstruction signal $S_{ICI,r,k}^{(i)}$.

25. The progressive parallel interference cancellation method according to claim 22 further comprising:

estimating a plurality of channel impulse responses of a wireless channel, and calculating a plurality of coefficient according to the channel impulse responses, wherein a $k^{th}$ subchannel interference reconstruction signal $S_{ICI,r,k}^{(i)}$ corresponding to the $r^{th}$ receiving antenna is generated according to (2×i−2) subchannel frequency-domain estimation signals $\hat{S}_{t,((k-i+1))_N}^{(1)}$, $\hat{S}_{t,((k-i+2))_N}^{(2)}$, ..., $\hat{S}_{t,((k-2))_N}^{(i-2)}$, $\hat{S}_{t,((k-1))_N}^{(i-1)}$, $\hat{S}_{t,((k+2))_N}^{(i-2)}$, $\hat{S}_{t,((k+1))_N}^{(i-1)}$, ..., $\hat{S}_{t,((k+i-2))_N}^{(2)}$, $\hat{S}_{t,((k+i-1))_N}^{(1)}$ and the coefficients during the $i^{th}$ iteration.

26. The progressive parallel interference cancellation method according to claim 22 further comprising:

determining a plurality of bits $b_0$, $b_1$, ..., and $b_{MT-1}$ corresponding to the $k^{th}$ subchannels of the transmitting antennas according to the $k^{th}$ subchannel frequency-domain signals $Y'_{1,k}^{(i)}$, $Y'_{2,k}^{(i)}$, ..., and $Y'_{R,k}^{(i)}$ of the receiving antennas during the $i^{th}$ iteration, wherein M is a bit modulation order, R is a number of the receiving antennas, T is a number of the transmitting antennas, and the bits $b_{M(t-1)}$, $b_{M(t-1)+1}$, ..., and $b_{Mt-1}$ corresponding to the $k^{th}$ subchannel of the $t^{th}$ transmitting antenna are used for determining the subchannel frequency-domain estimation signal $\hat{S}_{t,k}^{(i)}$.

27. The progressive parallel interference cancellation method according to claim 26, wherein a plurality of sub iterations is performed during the $i^{th}$ iteration, and during each of the sub iteration, a probability message is generated for the bit $b_n$ according to the subchannel frequency-domain signal $Y'_{r,k}^{(i)}$, and a probability message is then generated according to the bit $b_a$ for the subchannel frequency-domain signal $Y'_{p,k}^{(i)}$, and during the last sub iteration, probabilities of the bits $b_0$, $b_1$, ..., and $b_{MT-1}$ are generated according to the probability messages, wherein p is an integer between 1 and T, and a and n are integers between 0 and (MT−1).

28. The progressive parallel interference cancellation method according to claim 27, wherein if the $i^{th}$ iteration is the last iteration, a hard decision is made according to the probabilities of the bits $b_0$, $b_1$, ..., and $b_{MT-1}$ to determine the bits $b_0$, $b_1$, ..., and $b_{MT-1}$, and if the $i^{th}$ iteration is not the last sub iteration, a soft decision is made according to the bits $b_0$, $b_1$, ..., and $b_{MT-1}$ to determine the bits $b_0$, $b_1$, ..., and $b_{MT-1}$.

29. The progressive parallel interference cancellation method according to claim 26 further comprising:

determining the subchannel frequency-domain estimation signal $\hat{S}_{t,k}^{(i)}$ according to the bits $b_{M(t-1)}$, $b_{M(t-1)+1}$, ..., and $b_{Mt-1}$ of the $k^{th}$ subchannel of the $t^{th}$ transmitting antenna.

* * * * *